March 10, 1936.  A. G. FORGET  2,033,887
UPHOLSTERY MAKING MACHINE AND METHOD
Filed May 3, 1933   20 Sheets-Sheet 1
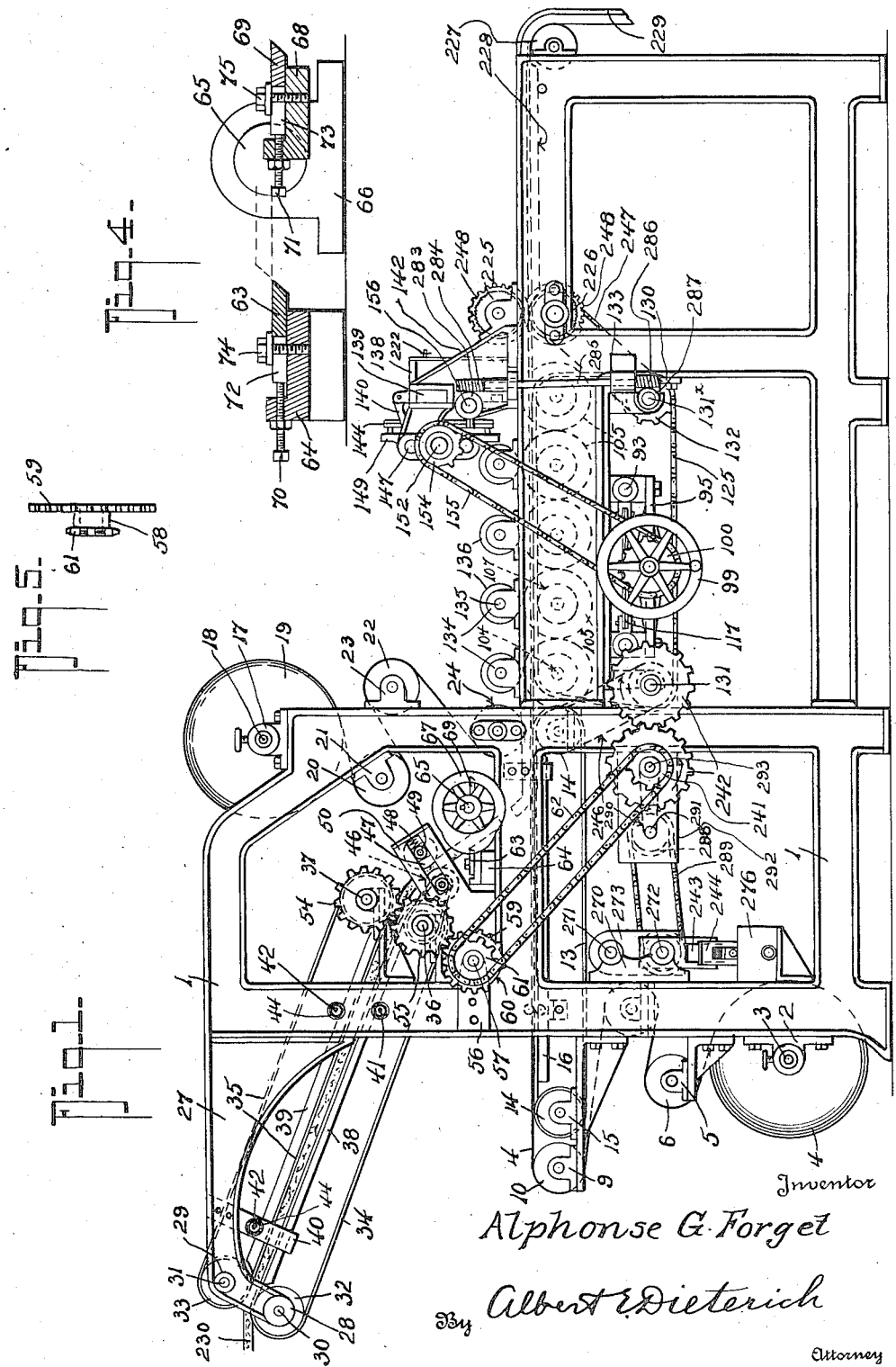
Inventor
Alphonse G. Forget
By Albert E. Dieterich
Attorney March 10, 1936.   A. G. FORGET   2,033,887
UPHOLSTERY MAKING MACHINE AND METHOD
Filed May 3, 1933   20 Sheets-Sheet 2
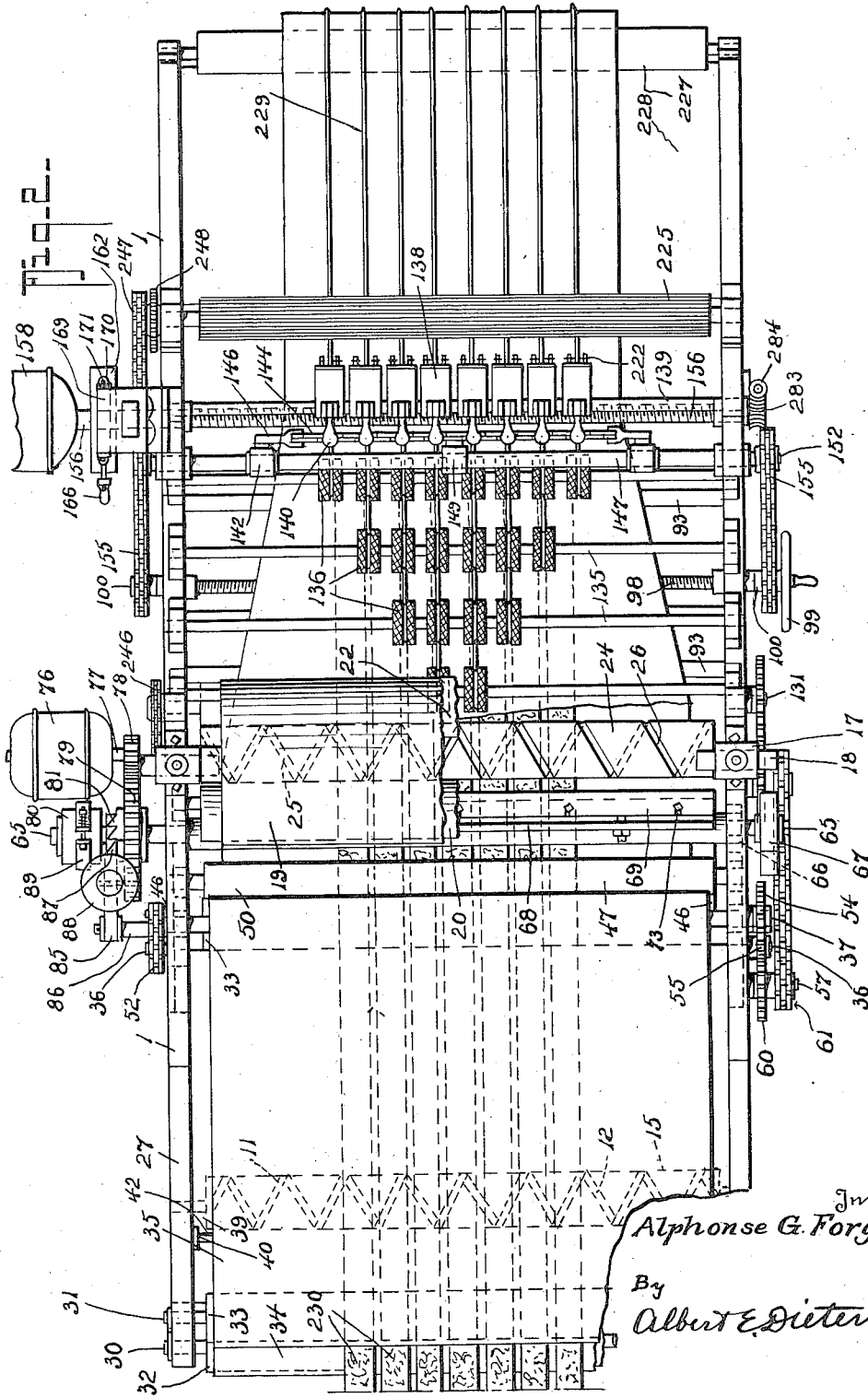
Inventor
Alphonse G. Forget
By Albert E. Dieterich
Attorney March 10, 1936. A. G. FORGET 2,033,887
UPHOLSTERY MAKING MACHINE AND METHOD
Filed May 3, 1933 20 Sheets-Sheet 3
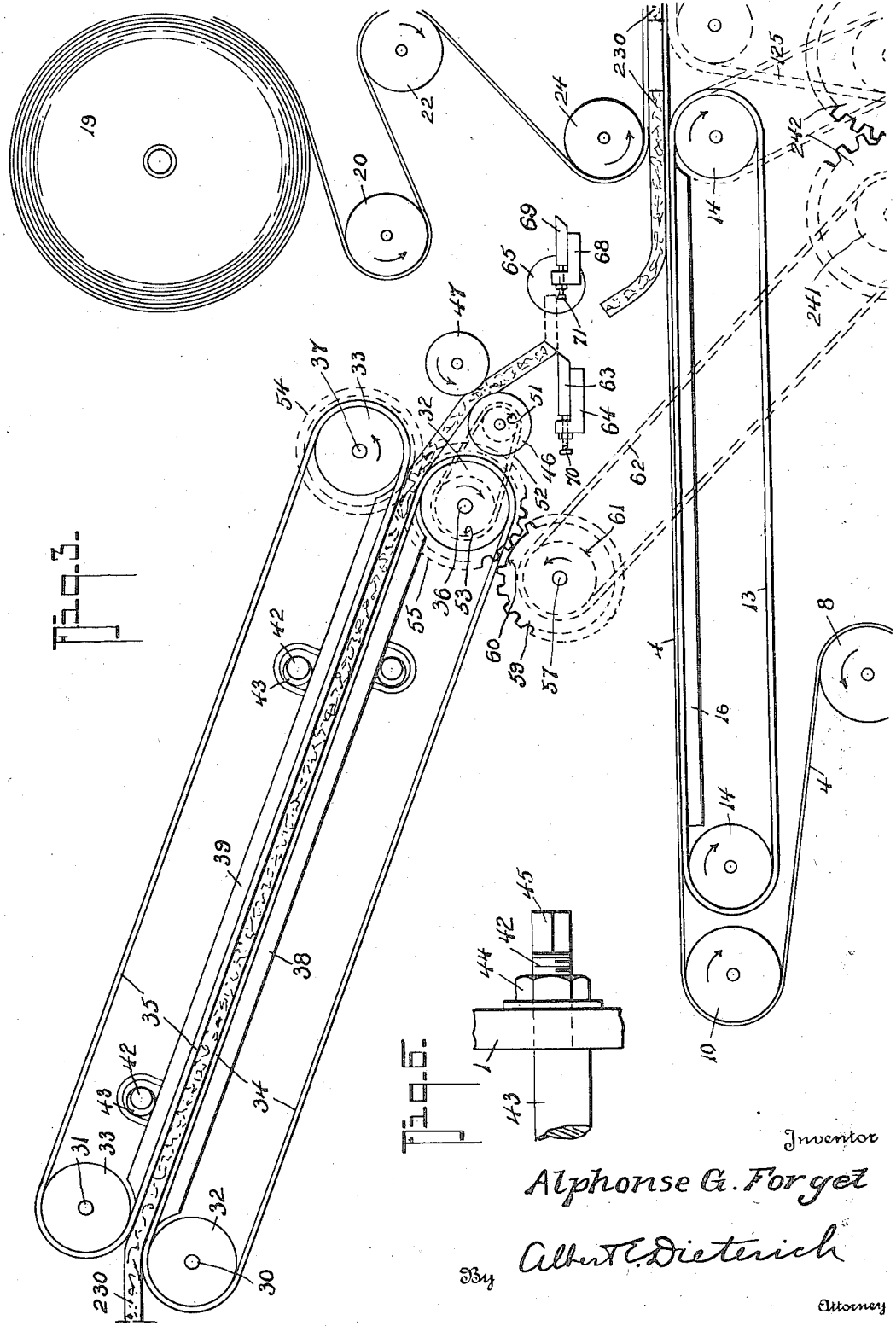
Inventor
Alphonse G. Forget
By Albert E. Dieterich
Attorney

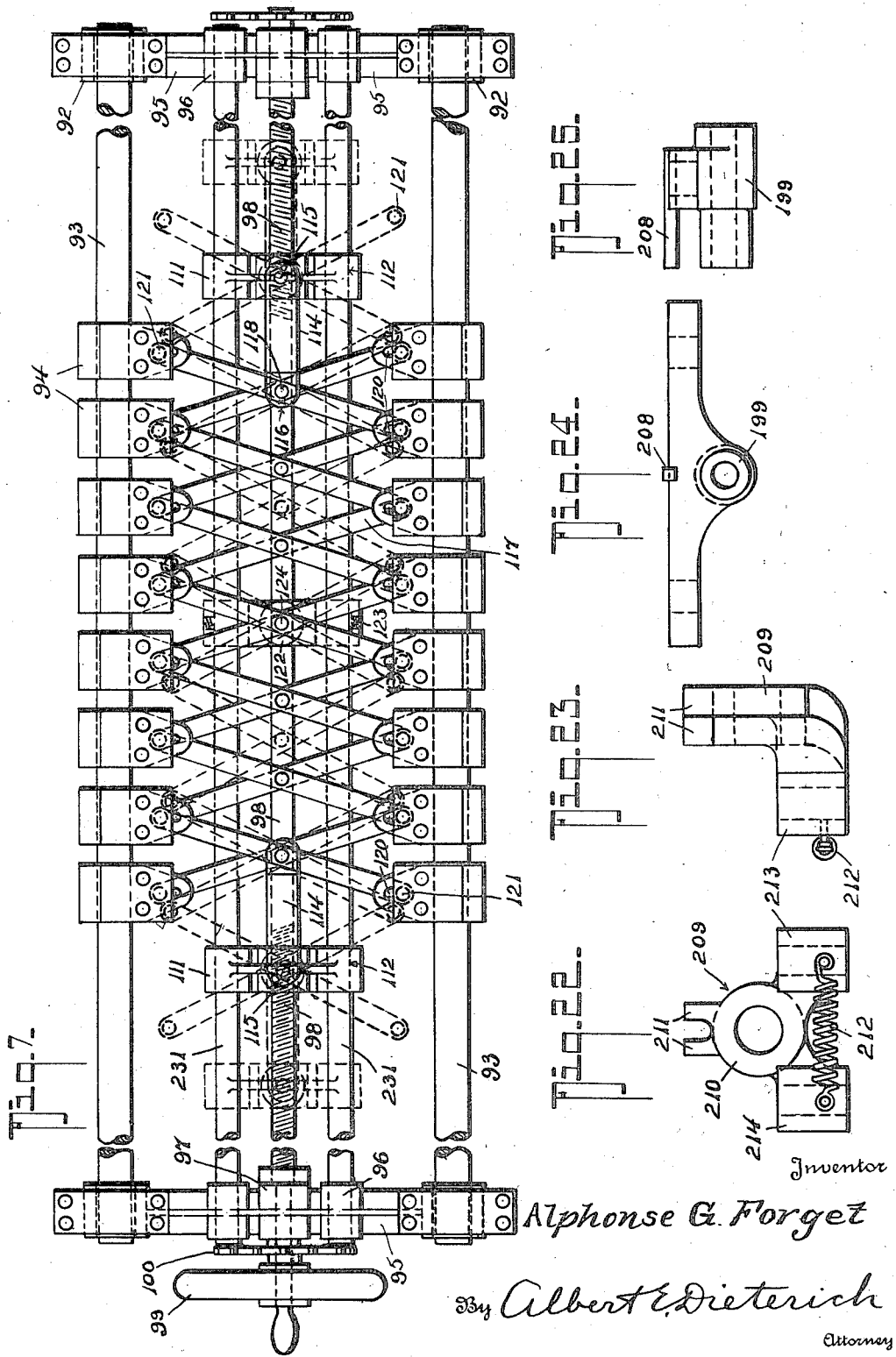

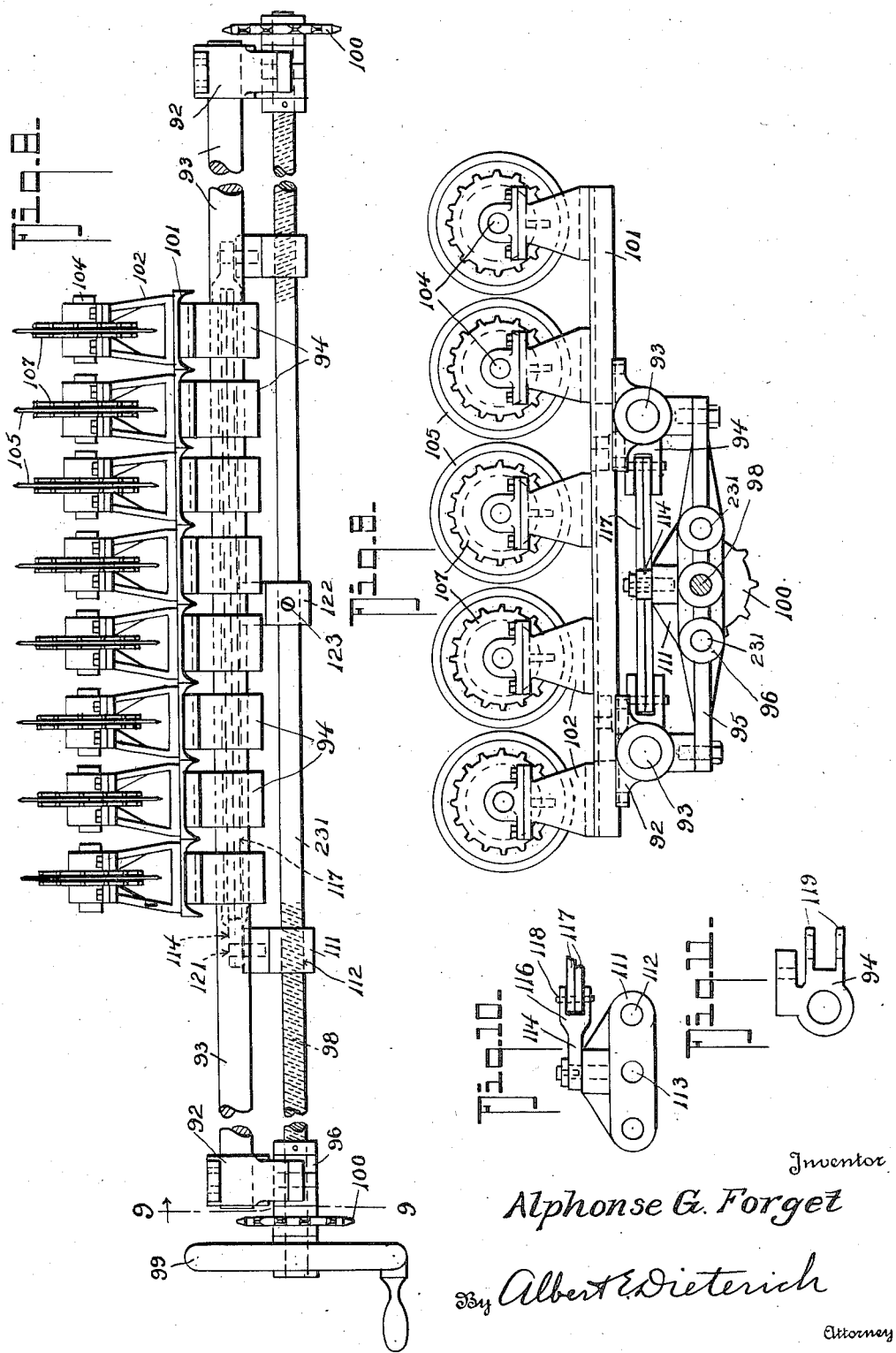

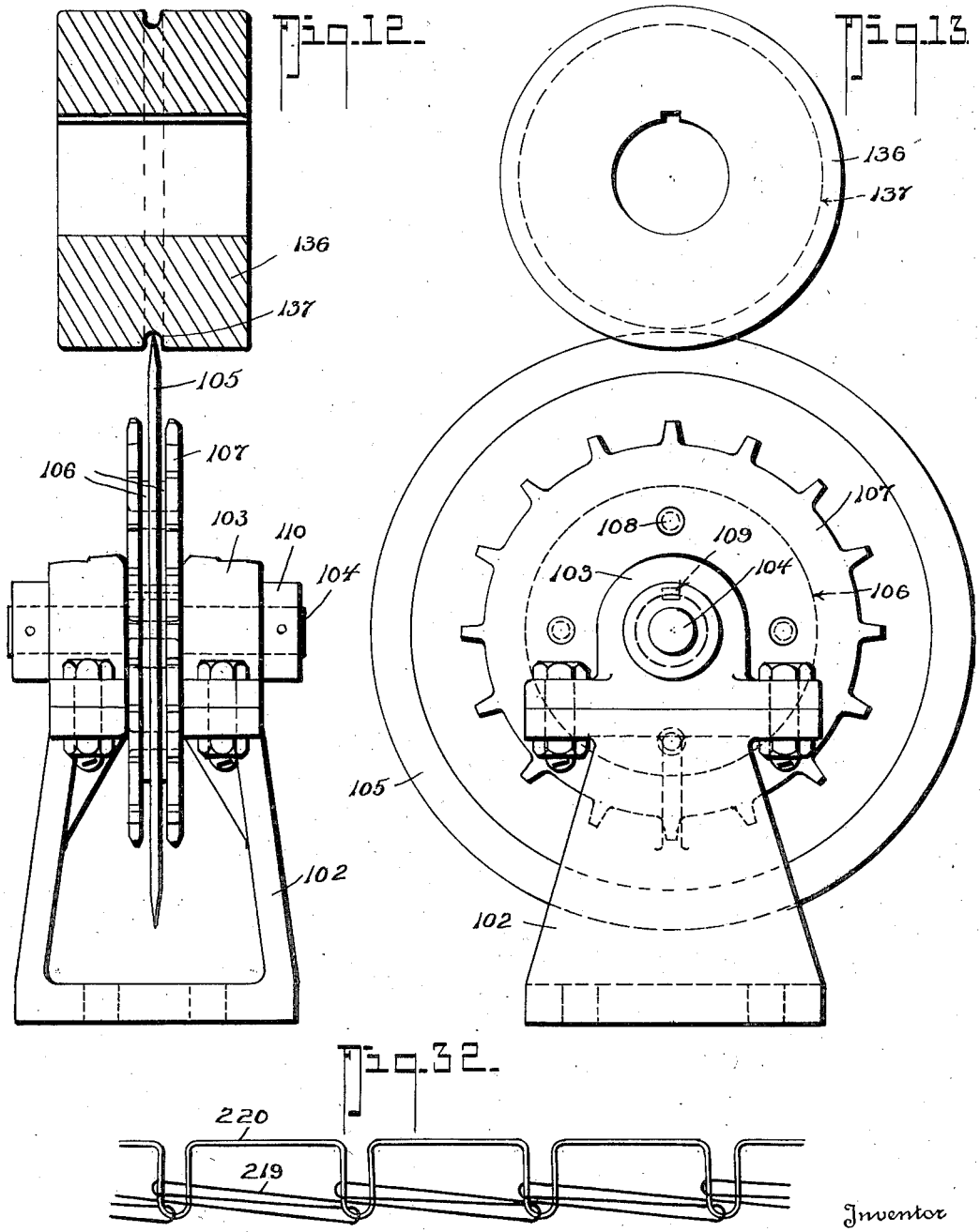

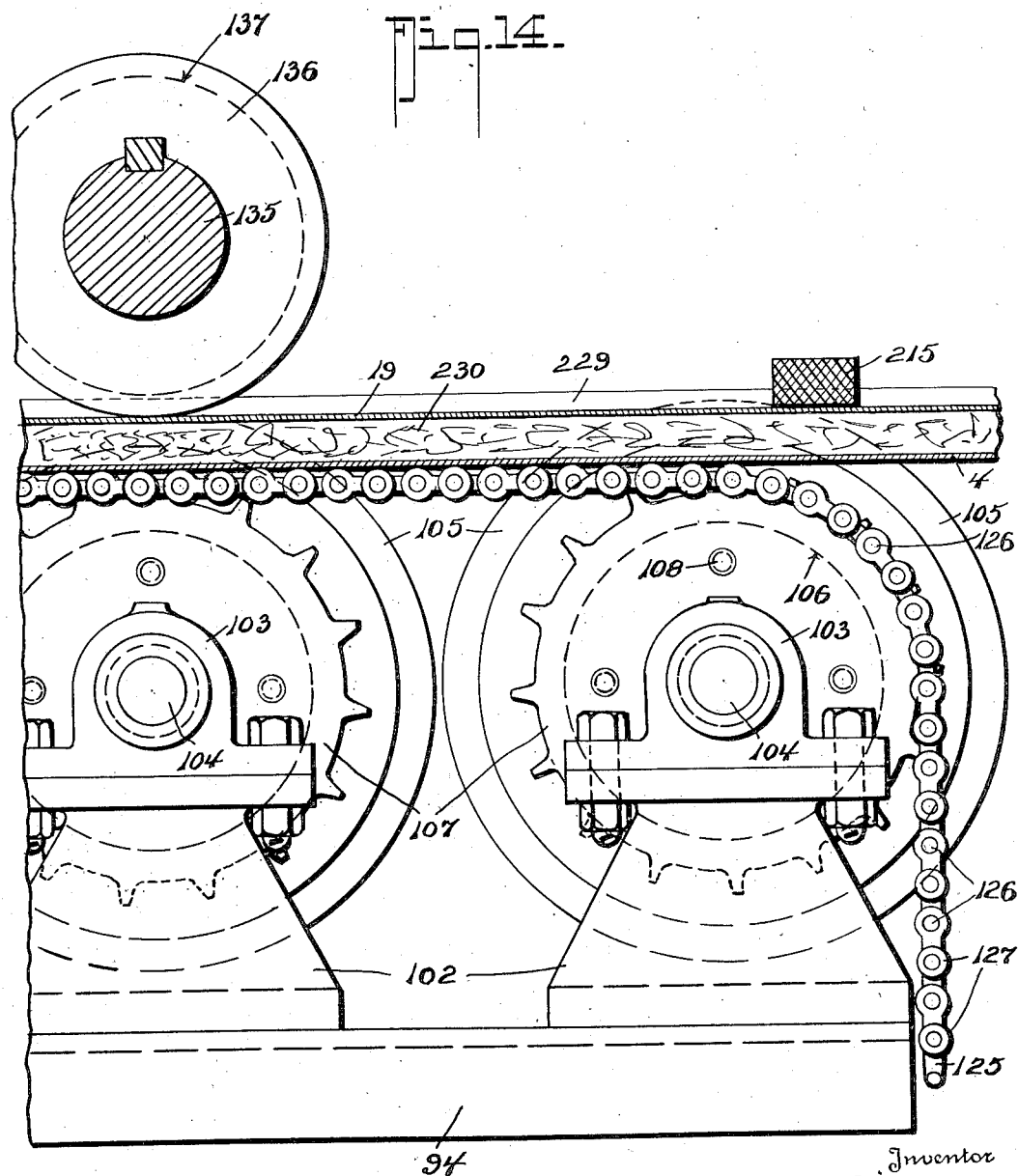

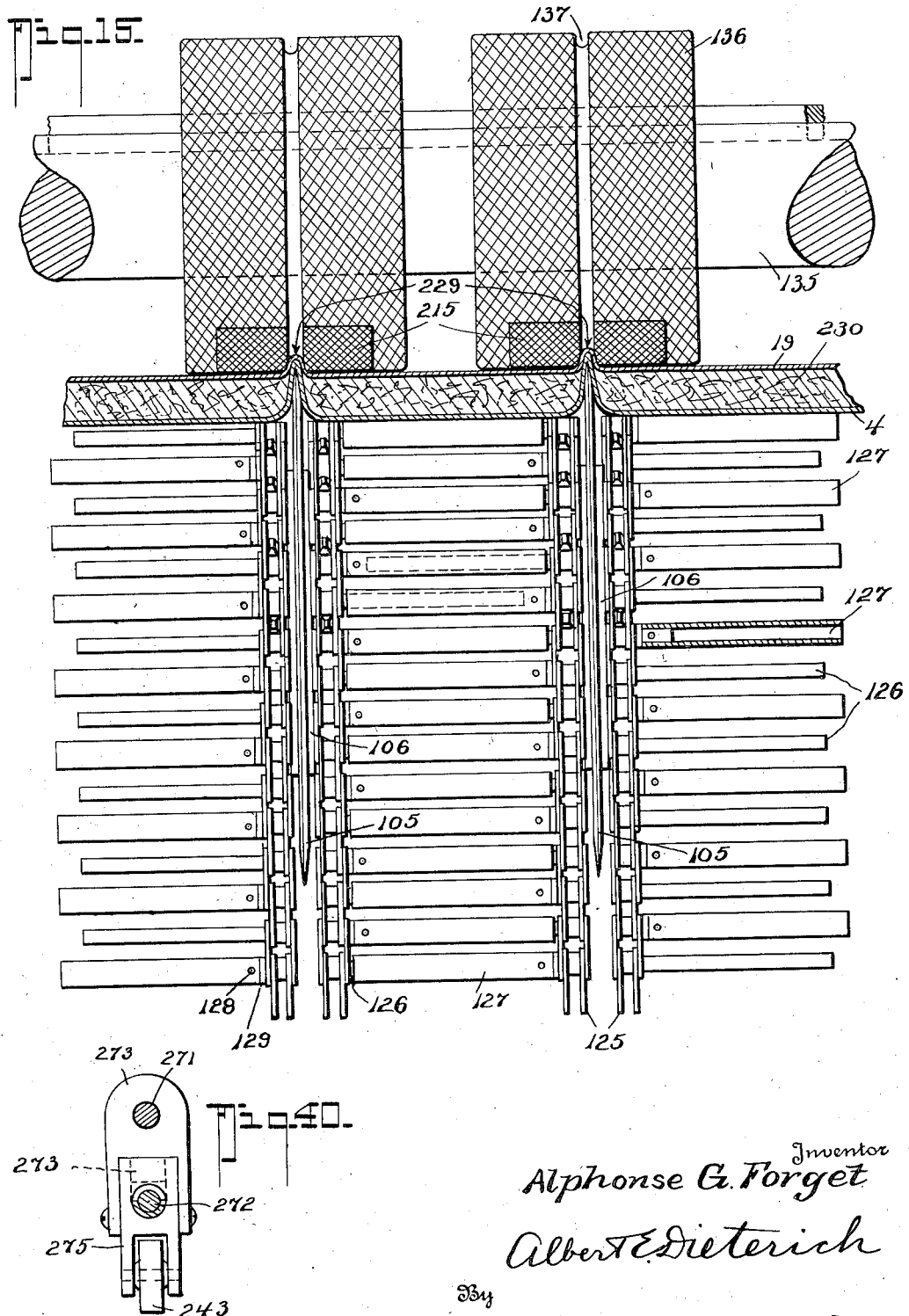

March 10, 1936. A. G. FORGET 2,033,887
UPHOLSTERY MAKING MACHINE AND METHOD
Filed May 3, 1933 20 Sheets-Sheet 9
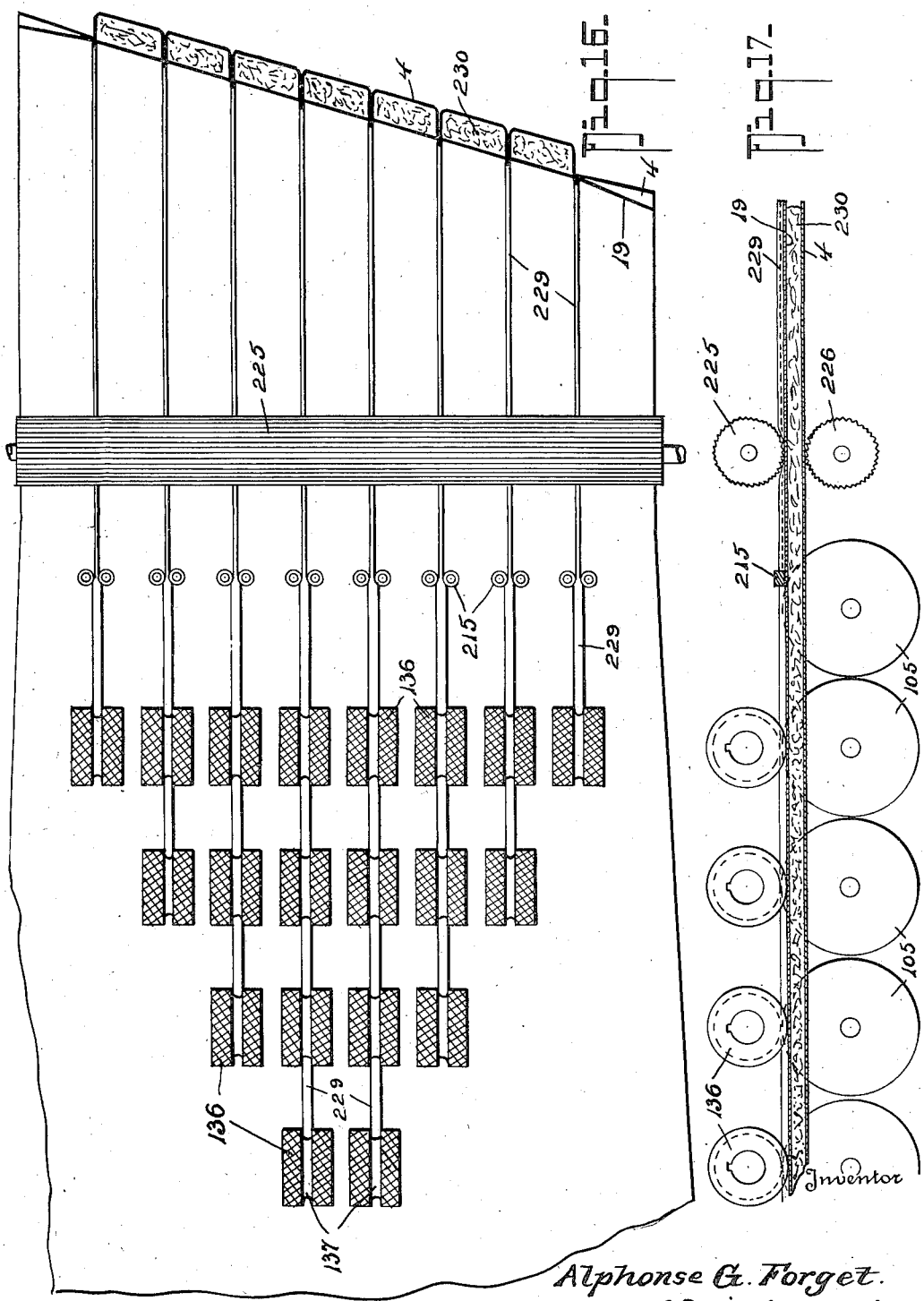
Alphonse G. Forget.
By Albert E. Dieterich
Attorney

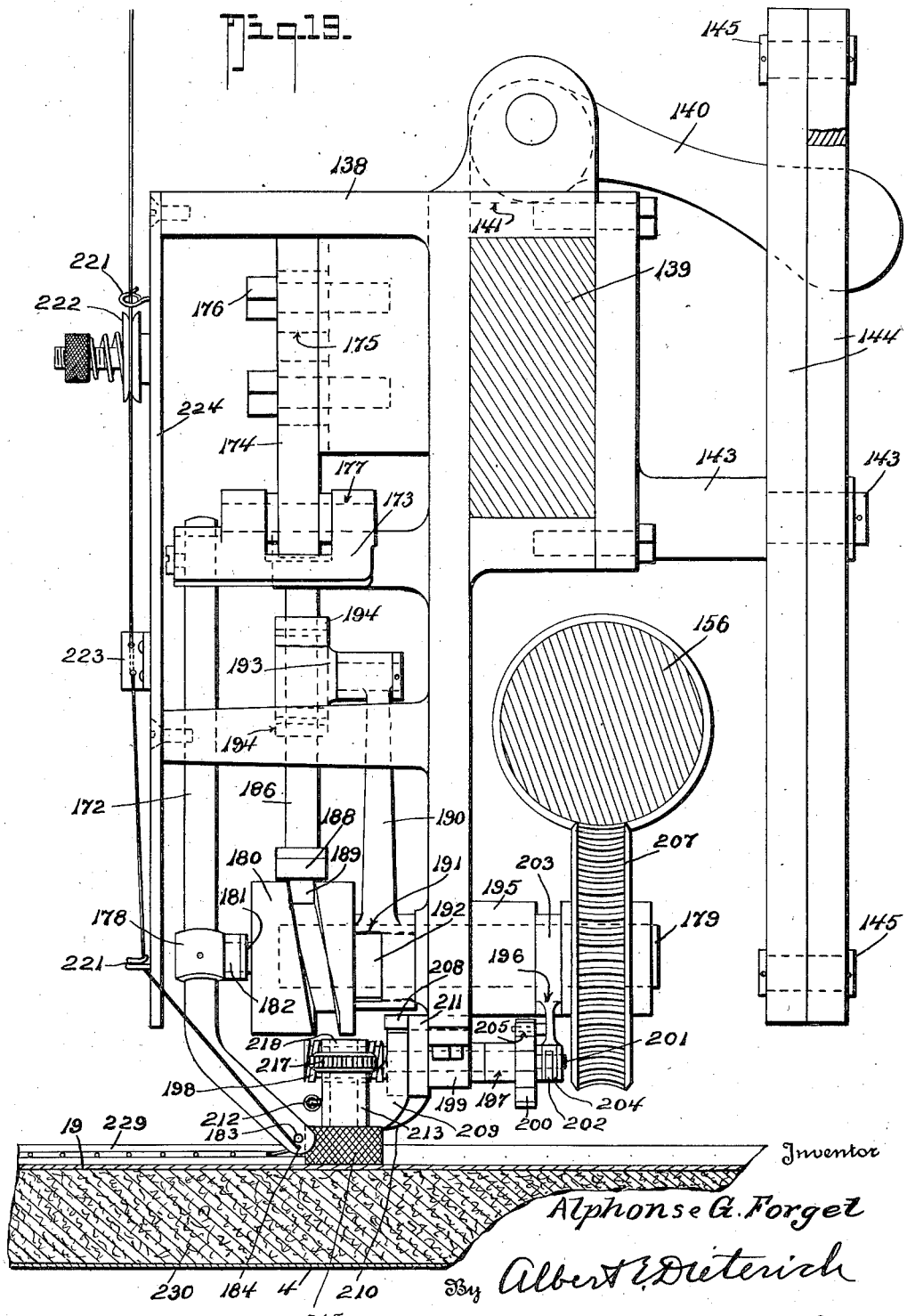

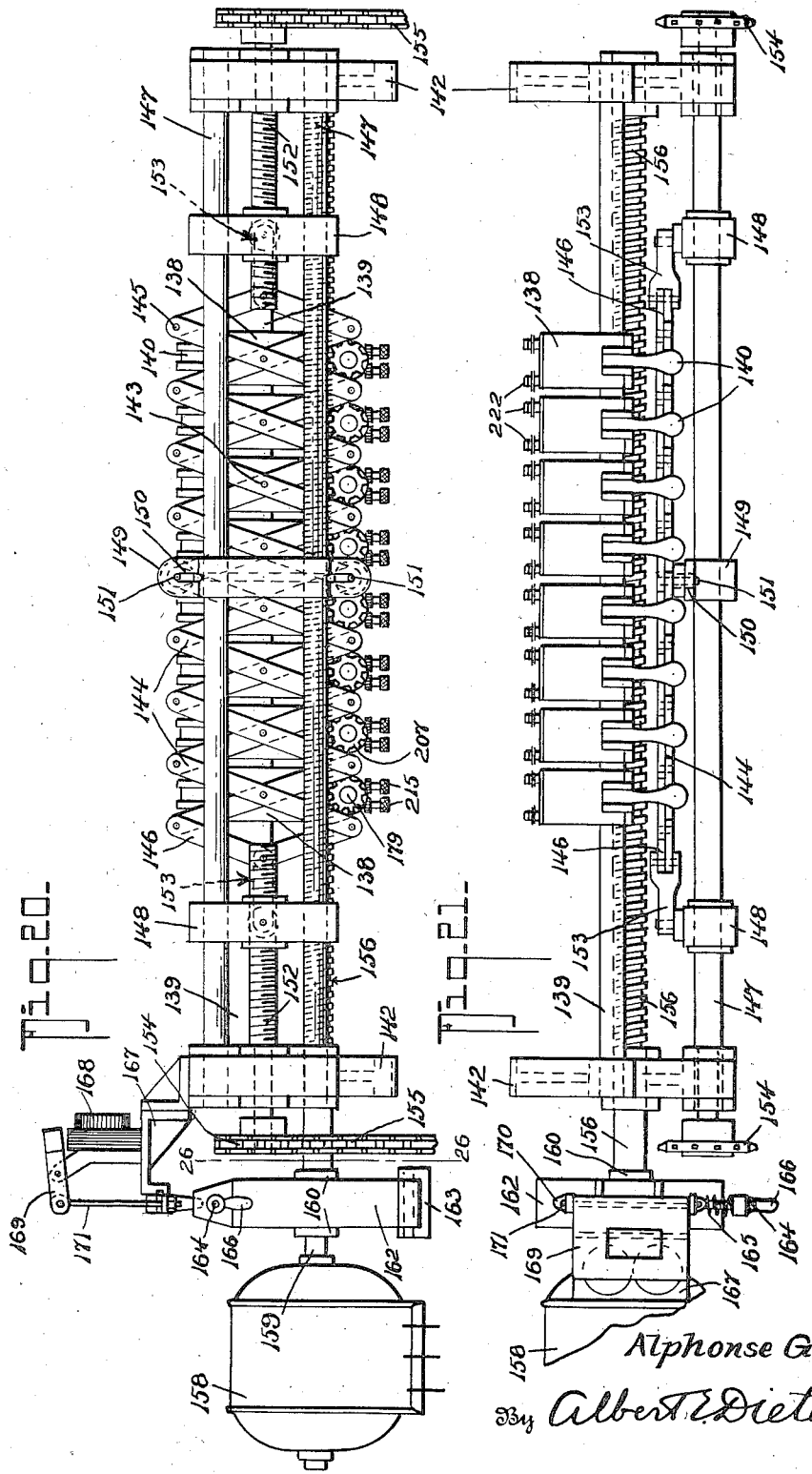

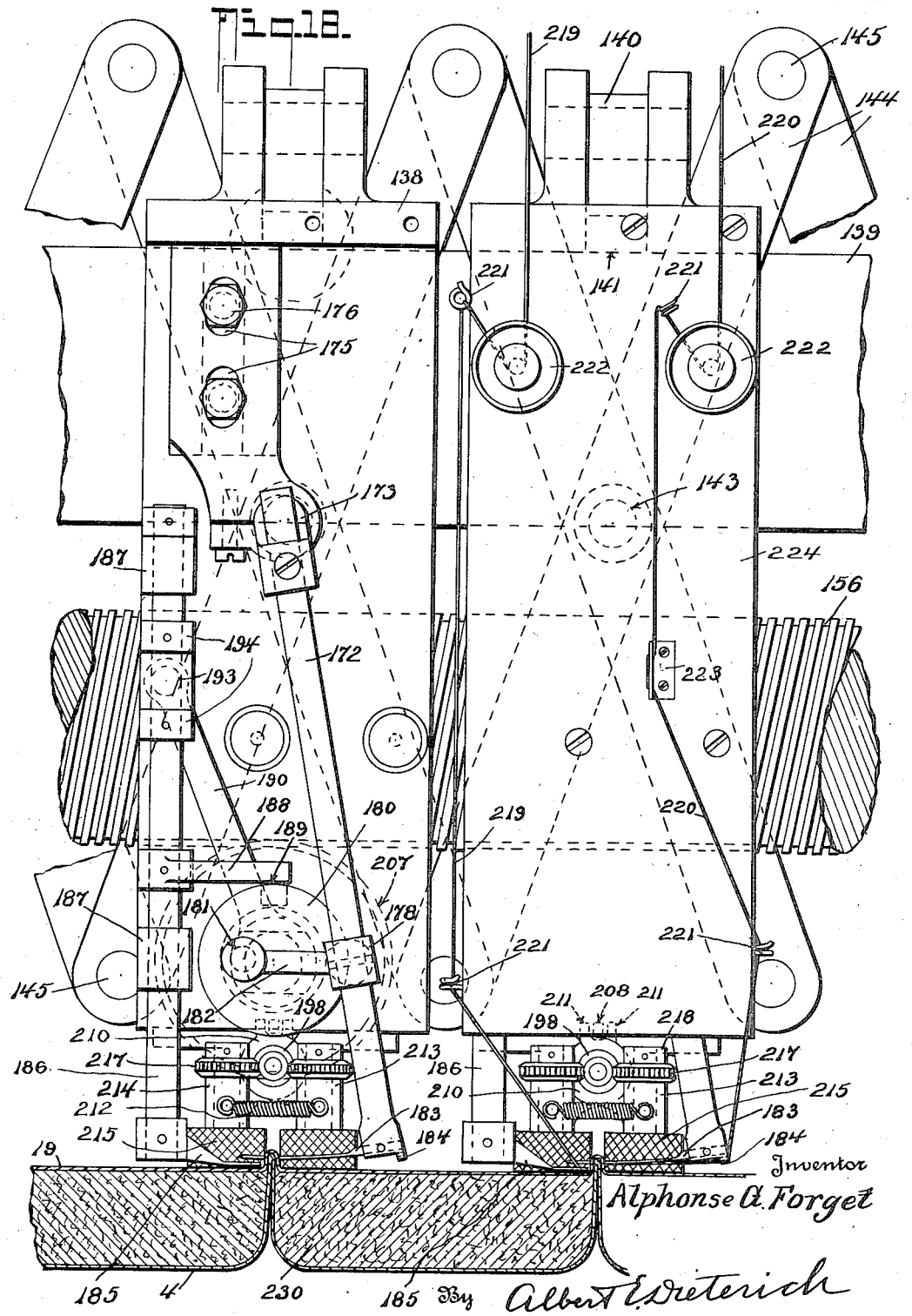

March 10, 1936.    A. G. FORGET    2,033,887
UPHOLSTERY MAKING MACHINE AND METHOD
Filed May 3, 1933    20 Sheets-Sheet 13
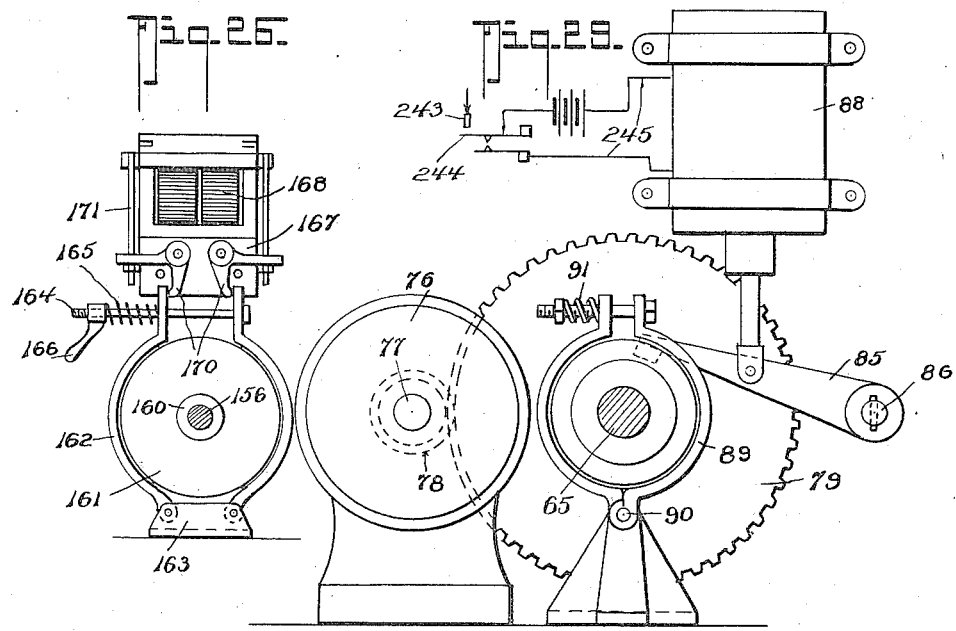
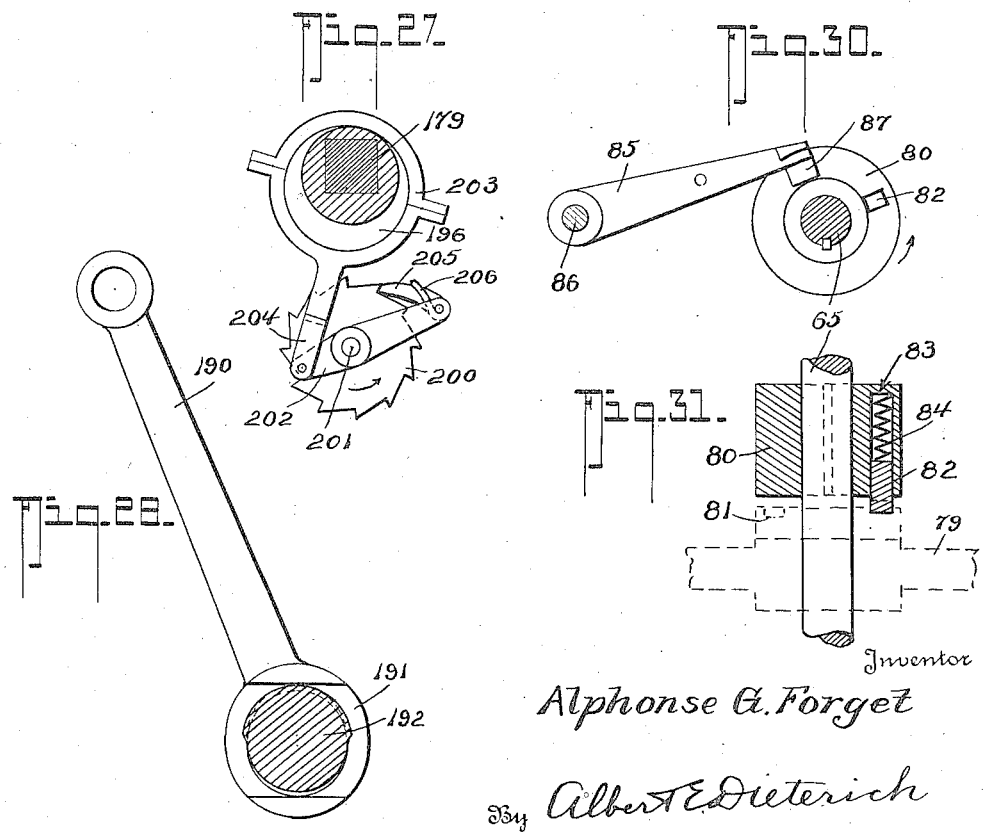
Inventor
Alphonse G. Forget
By Albert E. Dieterich
Attorney

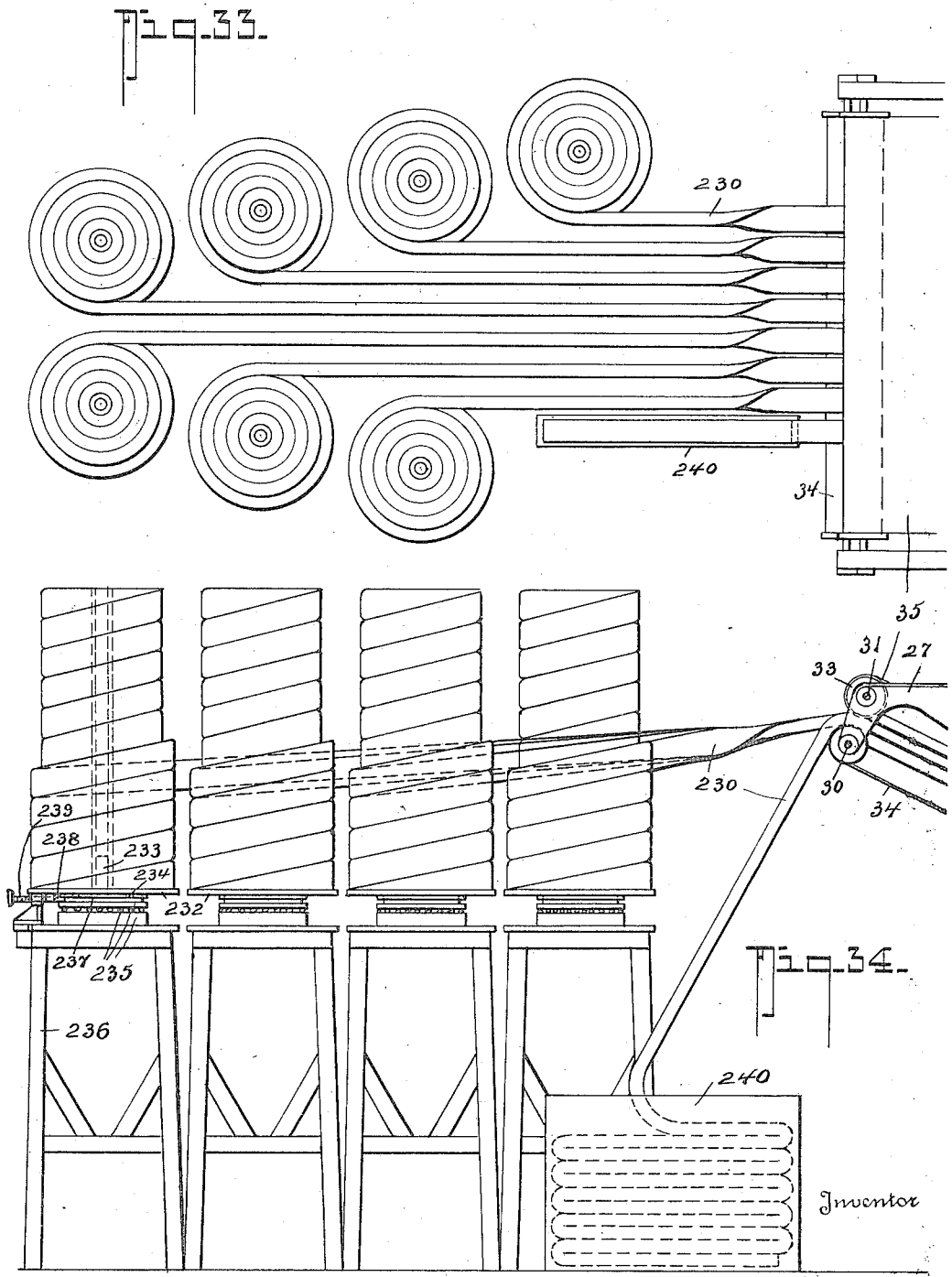

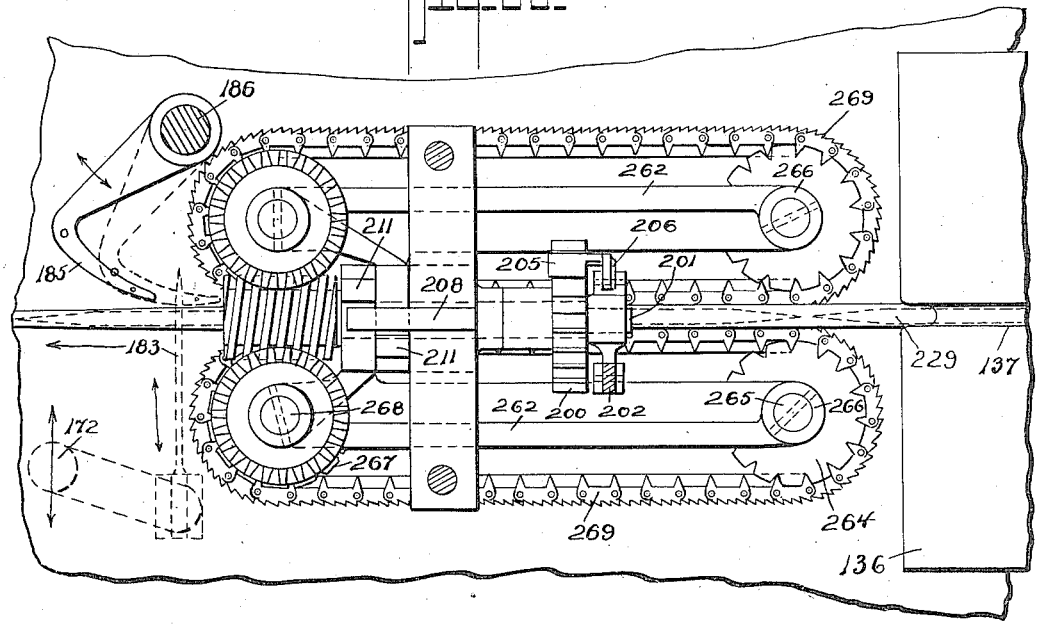
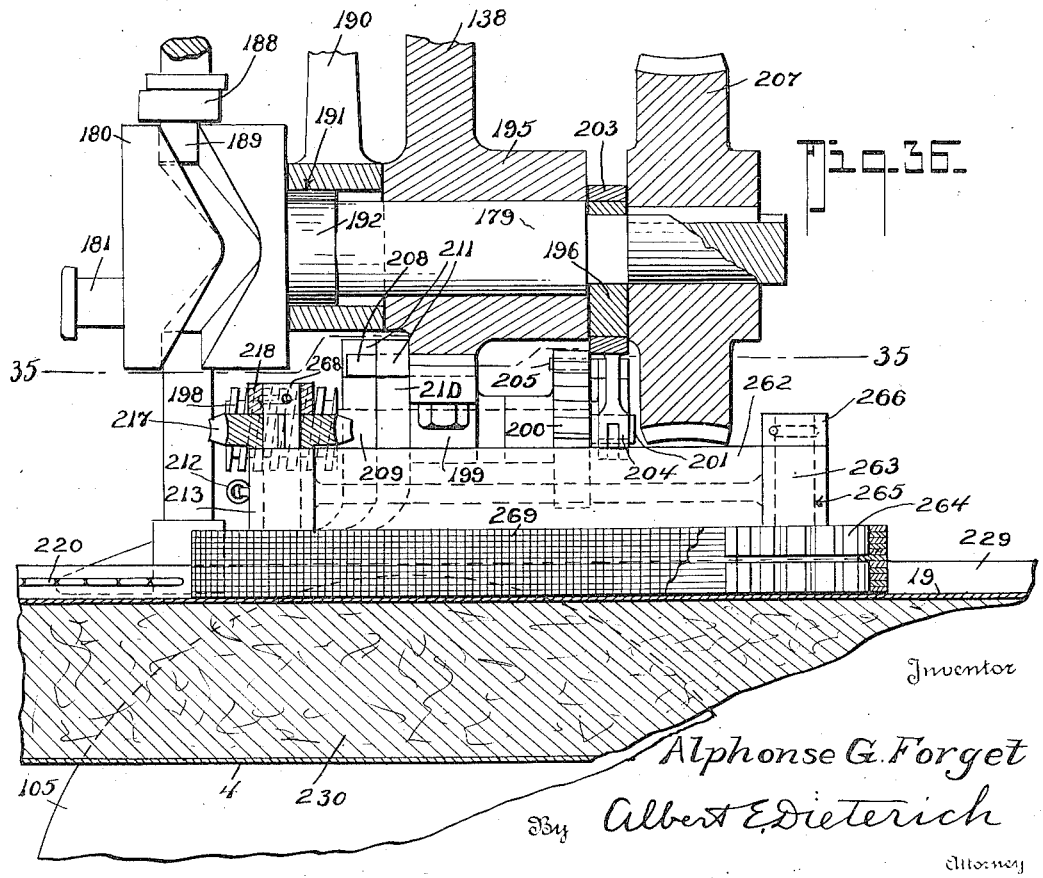

March 10, 1936. A. G. FORGET 2,033,887
UPHOLSTERY MAKING MACHINE AND METHOD
Filed May 3, 1933 20 Sheets-Sheet 16
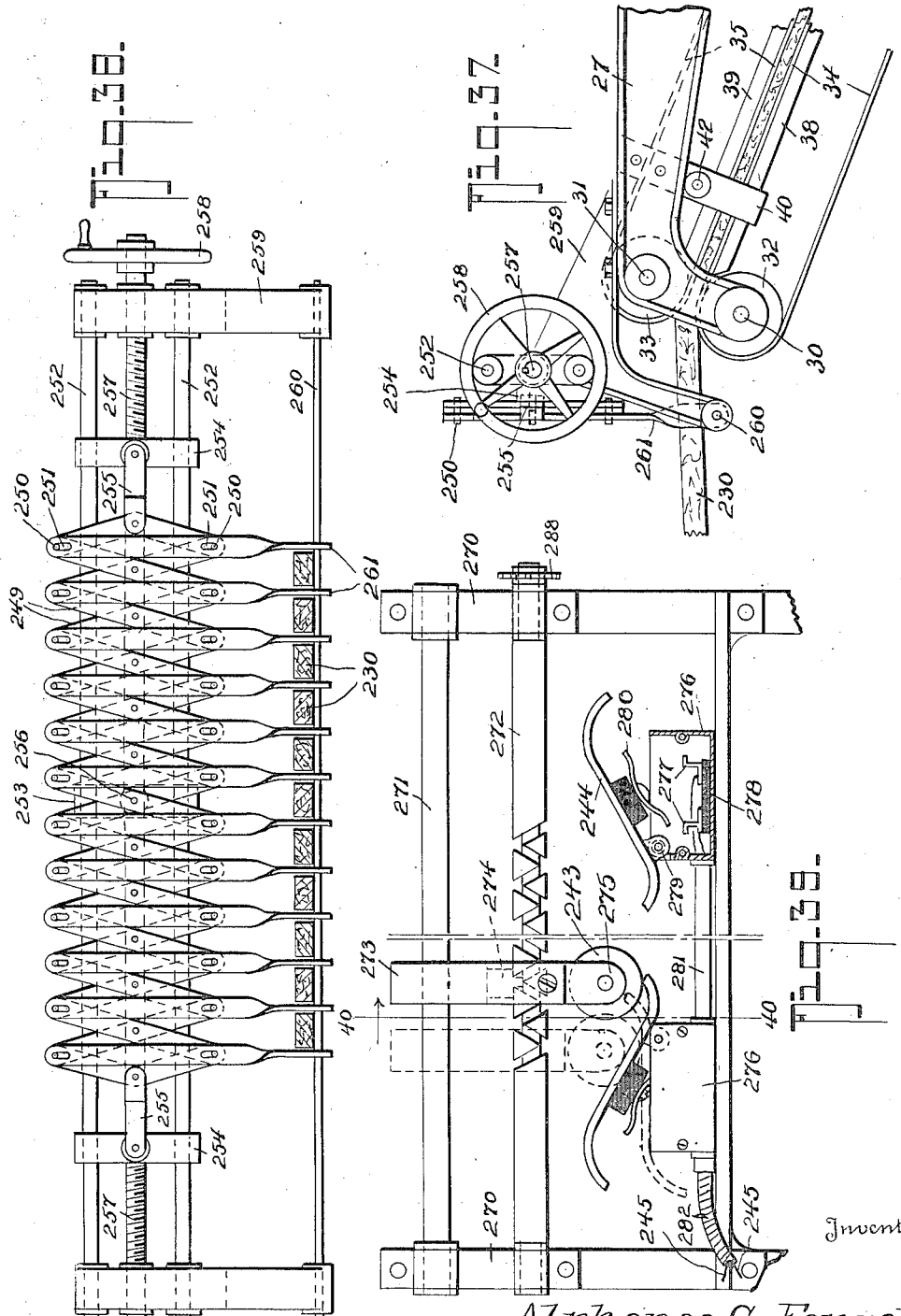

March 10, 1936.  A. G. FORGET  2,033,887
UPHOLSTERY MAKING MACHINE AND METHOD
Filed May 3, 1933  20 Sheets-Sheet 17
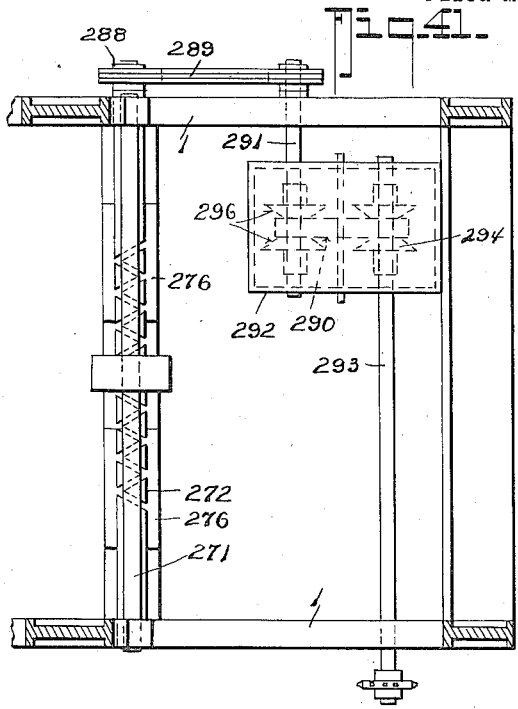
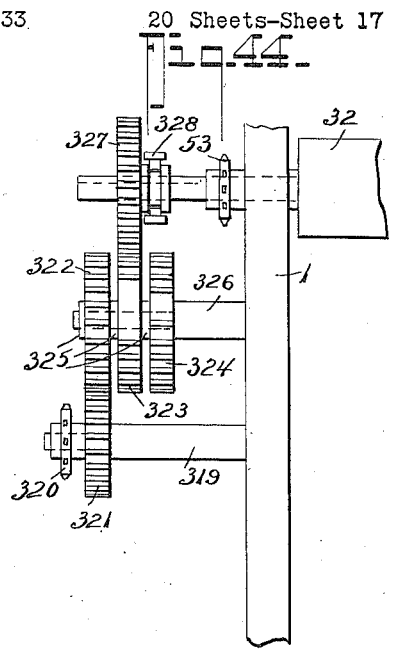
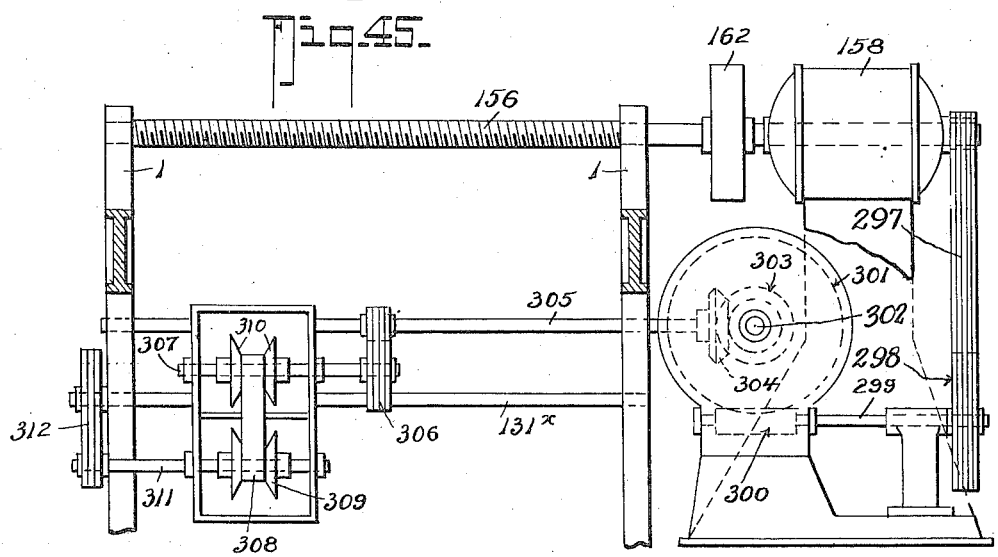
Inventor
Alphonse G. Forget
By Albert E. Dieterich
Attorney March 10, 1936.　　　　　A. G. FORGET　　　　　2,033,887
UPHOLSTERY MAKING MACHINE AND METHOD
Filed May 3, 1933　　　20 Sheets-Sheet 18
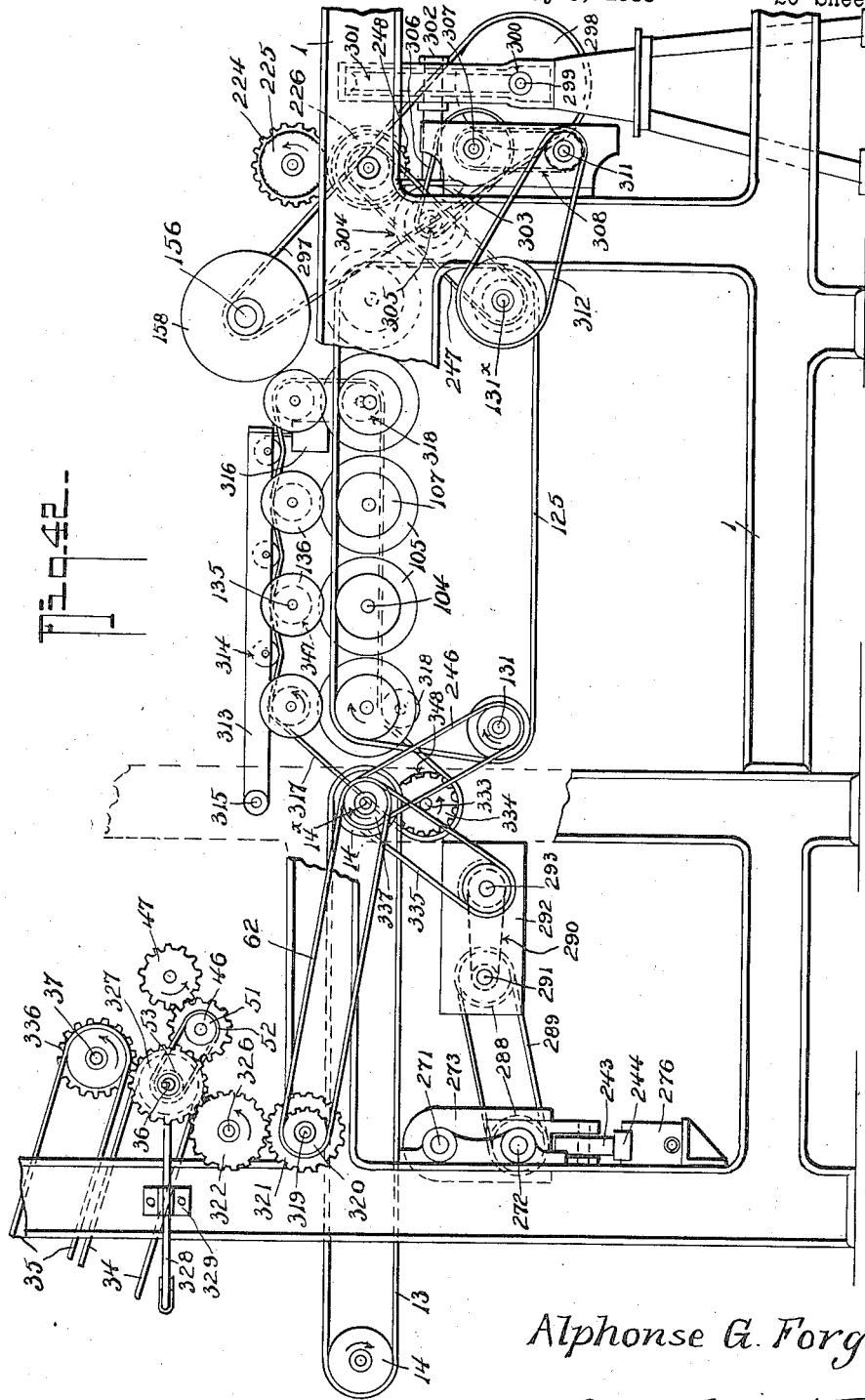
Inventor
Alphonse G. Forget
By Albert E. Dieterich
Attorney

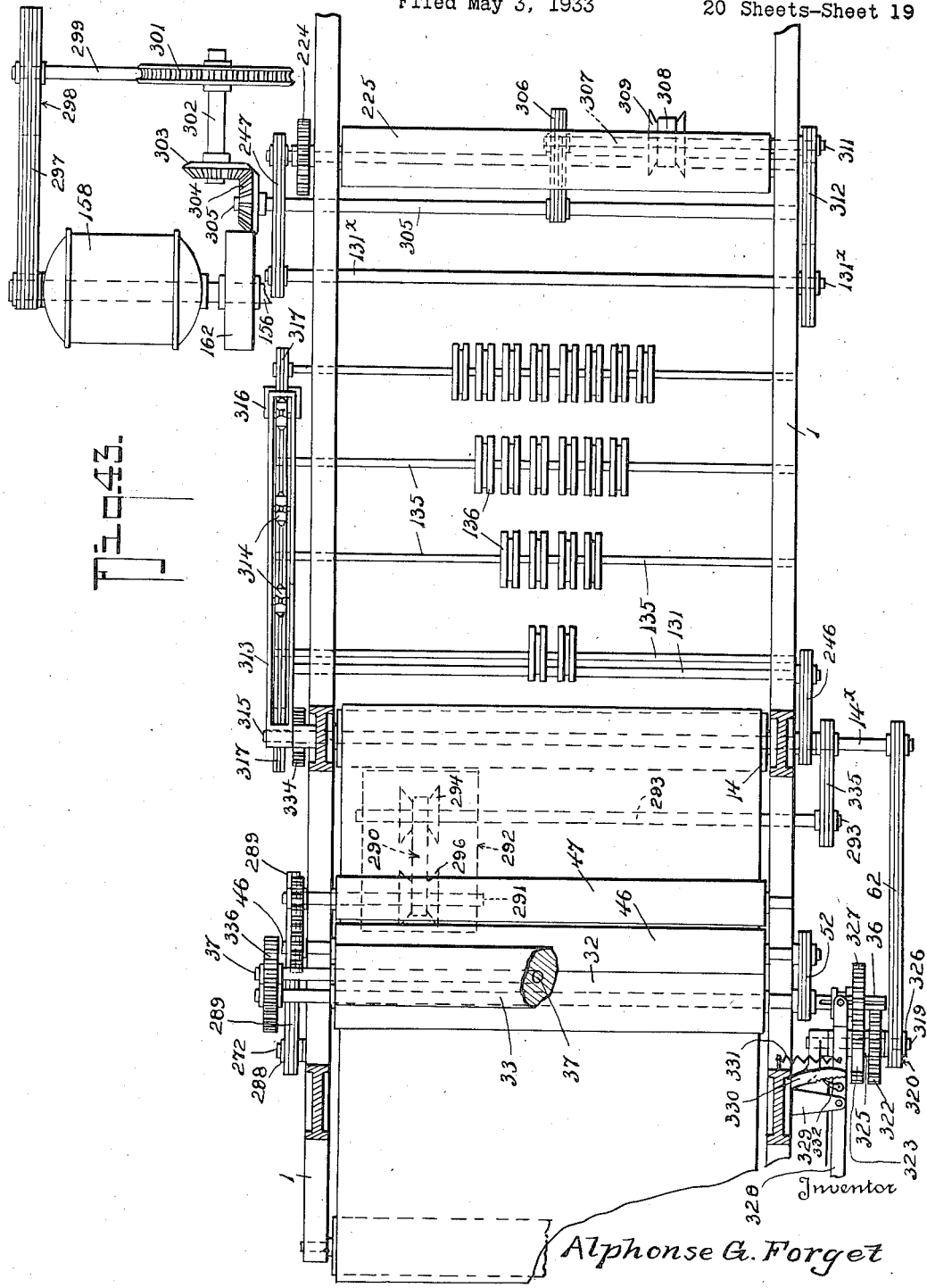

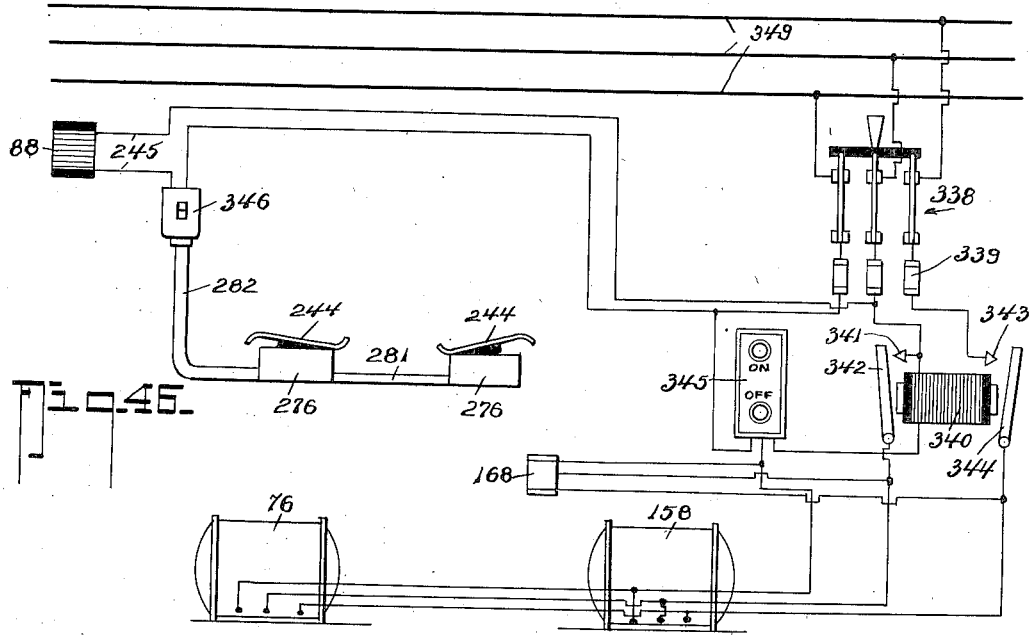
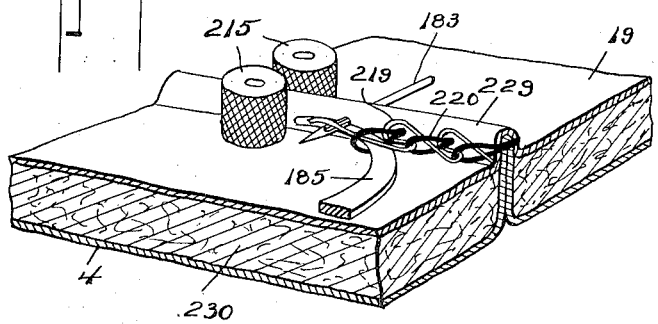

Patented Mar. 10, 1936

2,033,887

UNITED STATES PATENT OFFICE 2,033,887

UPHOLSTERY MAKING MACHINE AND METHOD

Alphonse G. Forget, Cohoes, N. Y.

Application May 3, 1933, Serial No. 669,268

60 Claims. (Cl. 112—2)

My invention relates to machines which are used in the manufacture of pleated upholstery, preferably such as are employed in making seat and back cushions of automobiles.

Such machines generally comprise mechanism for feeding the top and bottom fabrics or other covering layers in superposed relation with the filling material between. This filling material is usually in the form of continuous bats. The machines also include mechanism for sewing the covering together in longitudinal laterally spaced ribs or pleats. An example of such a prior art machine is found in Letters Patent No. 1,825,573 to Brintnall and Ross.

Machines of the Brintnall and Ross type usually require that the cotton bat be provided with reinforced cores of gummed paper in order that the same may be fed to the machine and the lengths of bat separated from the remainder at proper intervals. Furthermore the Brintnall and Ross machines have no adequate provisions for the quick and accurate adjustment of the pleating and sewing mechanisms for wider or narrower pockets in the cushions, i. e., pleats of greater or lesser widths.

My invention has for its objects to provide an upholstery making machine which embodies means for feeding batting to the sewing heads or sewing machine proper without the aid of a gummed paper core; to provide means automatically to stop the movement of the batting while the cutting off mechanism operates; to provide a new method and means for forming the pleats which consists in forming only two pleats at the same time but forming them progressively until the required numbers are made to the width of the cloth, one pleat at a time on each side from the center of the cushion; to provide mechanism for feeding the formed pleats to the sewing needles and stopping the formed, pleated cloth while the sewing needles make the stitches, thus eliminating breakage of needles and thread and loss of production; to provide means to eliminate wrinkles in the cloth while passing the sewing machine and to relieve the needles so that they will not have to draw the thread up to pull the cloth up together when making the stitch; to improve the motions of the looper needles so as to support the formed pleats while the sewing needles are making the stitches and to eliminate many parts of the machine heretofore required; to improve the working parts of the sewing heads or sewing machine proper whereby the sewing needles and looper needles are made to operate and are timed from the same point and by a perfected mechanism whereby the sewing needles and the looper needles cannot get out of time with each other; to provide mechanism whereby the pleat forming and pleat sewing mechanisms can be quickly and conveniently adjusted to vary the widths of the pleats uniformly and without stopping the operation of the machine; to provide a cam to operate the looper needles by one revolution of the cam shaft thereby making the four different motions required by the looper needle and the two motions (back and forth) of the sewing needle, to make a complete double locked stitch on each revolution of the cam shaft.

Further, it is an object to provide an automatic means to cleanly cut the bats into the desired lengths as the cushions are being formed and sewn and to retard the feed-on of the bats after the cutter has operated to allow the severed ends to become separated a definite and predetermined distance.

The multiple stitching machines that are in use at the present time are not designed or adapted to make use of the standard make of folded batting unless a gummed paper or the like is used for a core in the center of the folded batting; the gummed paper is used to give strength to the batting to overcome the drag of the machine, otherwise if the standard make batting (without paper core) were used without the gummed paper core the batting would be continually breaking. The use of this gummed paper core is very unsatisfactory to the automobile trade and owing to the same being covered by Letters Patent the royalties add a substantial amount to the cost of manufacturing cushions. A further object of my invention, therefore, is to overcome the above mentioned objections and others by developing a machine that can satisfactorily use standard bats as well as paper cored bats.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Figure 1 is a side elevation of a machine embodying my invention.

Figure 2 is a top plan view of the same.

Figure 3 is an enlarged diagrammatic vertical longitudinal section of the bat and cloth feed-in and bat severing mechanisms.

Figure 4 is an enlarged vertical cross section of the bat severing knives.

Figure 5 is an enlarged detail section of the mutilated gear and sprocket unit.

Figure 6 is an enlarged detail view of the ceiling adjusting shaft.

Figure 7 is a top plan view of the lazy tongs adjuster mechanism for the pleat forming mechanism.

Figure 8 is an elevation of the part shown in Figure 7 with the pleat forming disks mounted thereon.

Figure 9 is a section on the line 9—9 in Figure 8.

Figure 10 is a detail elevation of one of the transverse adjusting slide blocks.

Figure 11 is a detail elevation of one of the slide bearings.

Figure 12 is an enlarged end elevation of and part vertical section of one pleat forming unit.

Figure 13 is a side elevation of the part shown in Figure 12.

Figure 14 is an enlarged side elevation showing a pleat forming disk and roller unit and the final pleat form-retaining disk unit of the pleat forming mechanism.

Figure 15 is a detail elevation looking from right to left in Figure 14.

Figure 16 is an enlarged diagrammatic plan view showing the arrangement of the pleat forming rolls, squeeze rolls of the sewing machine and the out-feed corrugated rolls.

Figure 17 is an enlarged longitudinal section of the parts shown in Figure 16.

Figure 18 is a front elevation of a pair of sewing heads.

Figure 19 is a side elevation thereof.

Figure 20 is a detail elevation of the sewing heads and their mounting driving mechanism.

Figure 21 is a plan view of the mechanism shown in Figure 20.

Figure 22 is a detail front elevation of the adjustable swivel for the sewing machine squeeze rolls.

Figure 23 is a side elevation of the part shown in Figure 22.

Figure 24 is an elevation of the worm shaft bearing.

Figure 25 is a side elevation thereof.

Figure 26 is a detail view of the magnetic brake for the worm shaft drive.

Figure 27 is an enlarged detail section of the ratchet for the feed rolls' operating worm shaft.

Figure 28 is an enlarged detail view of the looper operating arm and the four-stage cam that cooperates with it.

Figure 29 is an enlarged elevation of the one revolution clutch mechanism for the bat severing mechanism.

Figure 30 is a detail view showing the pawl action and detent.

Figure 31 is an enlarged detail section of the detent clutch for connecting the knife driving motion to the rotating knife shaft.

Figure 32 is an enlarged diagrammatic view showing the stitch made by my machine.

Figure 33 is a plan view showing how the bats may be taken either from rolls or bales or from lap-boxes, or both.

Figure 34 is a side elevation of the parts shown in Figure 33.

Figure 35 is a horizontal section on the line 35—35 of Figure 36.

Figure 36 is a side elevation, parts being in section of a portion of a sewing machine with a modified construction of pleat feeding mechanism.

Figure 37 is a detail elevation of the preferred form of the invention showing the bat adjusting mechanism in place.

Figure 38 is an elevation of the bat adjusting mechanism shown in Figure 37 per se.

Figure 39 is an elevation of a portion of the bat cutter controlling mechanism which is a preferred form of the invention.

Figure 40 is a cross section on line 40—40 of Figure 39.

Figure 41 is a diagrammatic detail plan of a portion of the bat cutter controlling mechanism.

Figure 42 is a detail side elevation somewhat diagrammatic showing another drive arrangement for the various conveyors.

Figure 43 is a plan of Figure 42.

Figure 44 is a detail vertical elevation of a portion of the machine hereinafter specifically referred to.

Figure 45 is a detail vertical elevation looking from right to left in Figure 43.

Fig. 46 is a circuit diagram.

Figure 47 is a detail perspective view later referred to.

In the drawings in which like numerals and letters of reference indicate like parts in all of the figures, I represents the frame of the machine on which is mounted bearings 2 for the stub shafts 3 which receive the roll of cloth 4. Above the bearings 2 are brackets 5 having an idler roll 6 over which and over an idler roll 8 in bearings 7 the cloth from roll 4 is passed.

Extending outwardly from the frame I are bearing brackets 9 to support a stretching roll 10 which has reversed grooves 11 and 12.

An endless conveying apron 13 passes around rolls 14—14, see Figures 1, 3, and 42, mounted in suitable bearings 15 and its upper flight passes over a table 16.

The frame I also has bearings 17 for the stub shafts 18 (see Figures 1 and 2) which carry the second roll of cloth 19. The frame also carries bearings 21 and 23 for the idler rolls 20 and 22 respectively. A stretching roll 24 having reversed grooves 25 and 26 is also mounted on the frame I. The cloth 19 passes around rolls 20 and 22 and under roll 24 from whence it passes, together with cloth 4, through the pleating mechanism, the bats 230 having first been fed into position between the layers of cloth 4 and 19 in a manner presently to appear.

*The bat in-feeding mechanism (see Figs. 1, 2, and 3)*

This mechanism includes brackets 27 extending from the frame I and having bearings 28 and 29 for the shafts 30, 36, 31, 37 of the belt rolls 32 and 33. A lower endless belt 34 passes around a pair of rolls 32 while an upper endless belt 35 passes over a pair of rolls 33. The upper flight of the belt 34 passes over a floor 38 while the lower flight of the belt 35 passes under a ceiling 39 which is suitably supported by the frame of the machine. The ceiling and floor are preferably supported as at 40, 41, and 42, the shafts 42 having cams 43, threaded ends and nuts 44 by which the rods are locked to the frame. The rods have provisions 45 to receive a wrench so that by turning the rods, the distance between the floor and ceiling may be adjusted at will.

Held in suitable brackets 50 are bearings 49 which carry the shafts of a pair of press rolls 46 and 47, the upper roll being pressed toward the lower roll by tension springs 48. The lower roll 46 is driven from the adjacent shaft 36 by sprocket and chain connections 51, 52, and 53 which are so designed that the surface speed of the conveyor 38 and that of the roll 46 is the same. One of the shafts 36 and 37 of each conveyor 34 and 35 is geared to the other by spur gears 54 and 55 and they are given an intermittent motion by means of a mutilated gear 59 (having teeth missing as at 60) journalled on a stub shaft 57 carried by a bracket 56 and connected to a sprocket 61 by a sleeve 58. The sprocket 61, sleeve 58 and gear 59 (see Figure 5) constitute a unit. The sprocket 61 is driven by a chain 62 which in turn is driven from a sprocket 241 which is itself driven by means of a gear train 242 from the shaft 131 of the pleat forming mechanism. Hence the belt 38 is driven at the same speed as the conveyor of the pleat forming mechanism but periodically comes to rest when the mutilation 60 reaches the gear 55.

Instead of driving the conveyors 34—35 as above described provisions may be made whereby they may be driven either continuously, or stopped for longer or shorter intervals at the will of the operator. This is accomplished by the modifications shown in Figures 42, 43, and 44, by reference to which it will be seen a stud 319 projects from the frame 1 and on it is mounted a hub having a sprocket 320 and a spur gear 321. On another stud 326 is mounted a hub 325 having a spur gear 322 that continuously meshes with gear 321. The hub 325 also has a plurality of mutilated spur gears (two or more) 323—324 each having a definite and different number of teeth removed.

On the shaft of roll 32, longitudinally slidable on but keyed thereto, is a shiftable spur gear 327 (see Figure 44) having a grooved collar to cooperate with the forked lever 328 pivoted to a bracket 329 and held in its position by a rack 330 and pawl 332, a spring 331 serving to hold the pawl against the rack. The sprocket 320 is driven by the chains 62 which takes around a sprocket 337 on the shaft 14x.

The conveyors 34 and 35 are driven in unison by intergearing 336 (see Figures 42 and 43).

*The bat adjusting mechanism*

In order that the several bats 230 may have their spacing properly adjusted to correspond with the adjusted widths of the pleats, I preferably provide a mechanism for the purpose operating on the same principle as the pleat-former and sewing head adjusters. Such mechanism is illustrated in Figures 37, 38, and 39 of the drawings by reference to which it will be observed that brackets 259 are attached to the extension brackets 27 and carry a pair of slideway rods 252 on which are mounted a central block 253 (fixed to rods 252) and two end slide blocks 254. A toggle lever linkage 249 has its central pivot 256 on block 253 and has the ends of its links pivoted together by pins 250 which work up and down in slots 251 in a set of guide bars whose lower ends are bent at right angles to constitute separator fingers 261 which are apertured to slide on a guide rod 260 held in the brackets 259.

The linkage 249 is connected to the end slide block 254 by connecting links 255.

A screw 257 is mounted to rotate in bearings in bracket 259 and passes through the blocks 254 and 253. The screw rotates freely in block 253 but has oppositely threaded portions which have threaded engagement with block 254 so that as the screw is turned by hand wheel 258 the fingers 261 will be correspondingly spread apart to allow for the proper width bats according to the width of pleat pockets being made.

*Bat cutting mechanism (see Figs. 2, 3, 4, 29, 30, and 31)*

This is a one-revolution-and-stop type cutting mechanism and is composed of the stationary knife 63 and the rotating knife 69 with mechanism for operating the rotating knife at timed intervals. On a suitable support 64 which is firmly fastened to the frame 1 is a stationary blade 63. This blade is adjustably held by cap screws 74 passing through slots 72 and is adjusted by adjusting screws 70.

Mounted in bearings 66 is a shaft 65 which carries a knife support 68 and a balance wheel 67. The rotatable blade 69 is slotted as at 73 and is held in place by screws 75. It is adjusted by screws 71, see Figure 4.

The shaft is periodically rotated through a single revolution at a time by the mechanism now to be described. Referring particularly to Figures 2 and 29 to 31 inclusive, it will be observed that an electric motor 76 has its shaft 77 provided with a pinion 78 which meshes with a gear 79 that is loose on the shaft 65 and has a ratchet clutch face 81. A friction block 80 has a spring pressed pawl 82 located in its pocket 83, in which pocket the spring 84 is also present. When unobstructed the pawl 82 is in engagement with the ratchet 81 and locks the gear 79 in driving relation to the shaft 65. Normally, however, the pawl 82 is held out of engagement with the ratchet 81 by the wedge finger 87 of a pawl throw-put or controlling lever 85 that is pivoted on a stud 86. When the knife 69 is in the full line position of Figures 3 and 4 the finger 87 is located between the pawl 82 and the ratchet 81 and the shaft 65 is at rest. The finger 87 lies against the face of the friction block 80 and on the periphery of the ratchet 81 when the shaft 65 is at rest.

The pawl controlling lever is raised at predetermined intervals by a solenoid 88 whose circuit is made and broken by means hereinafter described to time the withdrawals to the length of bat section to be severed. In order that the rotating knife may not over-run its revolution I provide brake shoes 89 mounted on a bearing stud 90 and having an adjustable spring tension 91.

The means for controlling the bat cutter's action to give longer or shorter cut sections preferably comprises the mechanism shown in Figures 1, 39, 40, and 41, by reference to which it will be seen that in suitable brackets 270 secured to the frame of the machines, is a sliding bar 271 and a reversely threaded screw shaft 272 along which is movable a slide bracket 273 which has a screw dog 274 to cooperate with the screw 272. The bracket 273 carries the circuit opening and closing roller 243 which is held in the carrier 275 secured to the bracket 273. Two switch boxes 276 are located at either side of the machine and each has a pair of fixed contact terminals 277 that cooperate with the movable circuit closing member 280 carried by the switch lever 244. The contacts 277 are carried by an insulating block 278 while the movable member 280 is carried on an insulating block secured to lever 244. A conduit 281 carries wires from box to box, the wires 245 being carried to the first box by flexible conduit 282.

The wires 245 of the magnet circuit connect respectively with contacts 277—277 of each box 276. The circuit is normally held open by virtue of spring hinges 279 holding levers 244 elevated when they are not depressed by roller 243. The roller operates first one switch lever 244 and then the other at definitely timed intervals controlled and rendered variable at will by means of a small Reeves gear set. This includes a gear box 292 through which shaft 293 that carries gears 241—242, passes.

The shaft 293 carries separable driving cones. A counter shaft 291 also passes through the box 292 and has a pair of separable driven cones 296, a V-belt 290 passing around the sets of cones 294 and 296. Counter shaft 291 has a driving sprocket over which and over a sprocket 288 on shaft 272 an endless chain 289 passes. By moving one set of cones 296 farther apart and the other set 294 closer together, or vice versa, the speed of movement of the switch actuator 273 is changed accordingly. The shaft 293 is driven from shaft 14x by a sprocket and chain connection 335.

From the above it will be seen that the knife operating mechanism is a separately driven entity operating, however, in timed relation to the remainder of the machine. When the solenoid circuit is closed the lever 85 is lifted far enough to withdraw the finger 87 from the path of the pawl 82 which immediately is projected into the teeth of the ratchet 81, and shaft 65 is turned to cut the bats. At the same time that the knife reaches the dotted line position in Figure 4 mutilations 60 will reach gear 55 and the in-feed of the bat will cease long enough for the severed bat lengths to gain on the continuous bat remainder so as to leave a predetermined distance between each succeeding bat length and the one before it, see Figure 3.

*The pleat forming mechanism (Figs. 1, 2, and 7 to 17 inclusive)*

Suitable bridge beams or supports 95 are secured at each side of the frame 1 between which the pleat forming mechanism proper is located. The bridge beams 95 have sockets 92 for the main supporting rods or stationary shafts 93 on which are slidably mounted the slide bearings 94 to which the channel irons 101 are riveted, bolted or otherwise rigidly secured. The bearings 94 are arranged in pairs and the irons 101 connect the pairs together and lie parallel to each other in the lengthwise direction of the machine, see Figures 8 and 9.

A pair of smaller rods or shafts 231 are mounted in sockets 96 and are located between the rods 93 and in a horizontal plane below that which contains the rods 93. On the rods 231 three slide blocks 111, 122, and 111 are mounted. The center block 122 is rigidly secured in the mid-vertical plane of the machine by any suitable means as set screws 123, so as to remain stationary while the end or side blocks 111 are slidable along the rods 231, the blocks having bearing holes 112 for that purpose.

The blocks 111 are moved toward and from the center block 122 by a shaft 98 having reversely pitched threads at its ends which are threaded into apertures 113 in the blocks 111 and rotate in bearings 97 in the bridge beams 95. A smooth portion of the shaft 98 turns freely in the center aperture of the block 122. The screw shaft 98 is turned by a hand wheel 99 and it also carries sprockets 100 for a purpose later to appear.

The channel irons 94 carry a gang of bearing supports 102 which have bearings 103 for short shafts 104 on which are keyed as at 109 the pleat forming disks 105, the separators 106 and the sprockets 107. Each shaft 104 carries one disk 105, two separators 106 and two sprockets 107 which are riveted together as at 108 to constitute a unit. Collars 110, pinned to the ends of the shaft 104 hold the shaft against longitudinal movement in its bearings 103.

To each end block 111, at 115, is pivoted a link 114, which links are forked at 116 and are in turn pivoted at 118 to a "lazy tongs" system composed of crossed links 117. The links 117 are connected with the forked ears 119 of the slide bearings 94 which have slots 120 to receive the pivot pins 121 of the links. The "lazy tongs" have a center pivot 124 to the block 122 as shown.

Endless roller chains 125 pass over the sprockets 107 of the respective gangs of pleat forming units (one of which units is shown in Figures 12 and 13). These chains 125 carry alternately disposed rods 126—127, the rods 127 being tubular to receive the rods 126 of opposing chains. These chains 125 and rods 126—127 comprise an endless laterally expansible and retractible apron or conveyor for the cushions from adjacent the bat cutting mechanism through the sewing mechanism. The rods 127 are articulated as at 128, the stubs 129 being rigidly secured to the chains 125, as are also the rods 126.

Bearing brackets 130 are fastened to the frame 1 and carry shafts 131—131x on which are slidable sprockets 132 around which the chains 125 pass. Fingers 133 are secured to the channel irons 101 (see Figure 1) and project between adjacent sprockets 132 so as to move them in unison with the sprockets 107.

On the frame 1 are bearings 134 for shafts 135 on which the pleat forming rolls 136 are splined but are laterally movable for adjustment with the disks 105 as will later appear. The rollers 136 have pleat-rib-receiving grooves 137 into which the disks 105 project.

It will be seen by turning the hand wheel 99 the "lazy tongs" will be operated to change the spacing laterally between adjacent gangs of pleats to alter the width of the pleat pockets, i. e. change the spacing between the pleat ribs. In virtue of the "lazy tongs" linkage the space between each pair of gangs of disks 105 remains the same regardless of the width of the pleat pocket being formed.

In order that the rolls 136 (which rotate with but are slidable along the shafts 135) may be positively driven, I provide an endless chain 317 taking over sprockets 347 on the shafts 135, around idler sprockets 318 and around a driving sprocket 348 on a stub shaft 333 fixed to the frame 1. The sprocket 348 is driven from shaft 14x by a gear train 334 (Figures 42 and 43).

In order that the chain 317 may be kept at a proper tension I provide an arm 313 hinged at 315 and carrying idler sprockets 314 which are held down on chain 317 by a weight 316 to take up slack.

*The sewing mechanism (Figs. 1, 2, 18 to 21 and 26)*

The sewing mechanism comprises a multiplicity of sewing machines one for each complete rib, there being one sewing head for each pleat forming gang. Since each sewing head or sewing machine proper is of the same construction a description of one will suffice for all.

The several sewing heads 138 are transversely adjustably mounted on a fixed mounting bar 139 to which they may be rigidly held by an eccentric locking lever 140 acting against a wear plate or shoe 141 that engages the mounting bar 139. The bar 139 is rigidly held in its ends in brackets or frames 142 which are secured to the main frame 1.

The sewing head 138 on its back has a central pivot stud 143 to which the crossed links or adjusting bars 144 are pivoted. The crossed bars 144 are also pivoted together at the ends as at 145 and constitute a "lazy tongs" system. The ends 146 of the "lazy tongs" system are connected by links 153 to the end slide blocks 148.

A pair of stationary rods or shafts 147 are held in sockets in the bracket frames 142 and serve as slide rods for the end slide blocks 148, there being a center block 149 fixed to the rods 147 and having slots 150 in which the pins 151 of the "lazy tongs" lie.

Worm shafts 152 are journalled in suitable bearings in the frame 142 and lie in the same vertical plane as that containing the rods 147. The worm shafts 152 are provided with oppositely pitched threads to move the blocks 148 inwardly or outwardly in unison. They are driven by the chains 155 which pass over sprockets 154 on shafts 152 and sprocket 100 on shaft 98 so that the two "lazy tongs" systems work in unison.

The brackets 142 have bearings 157 for the main worm drive shaft 156 which is operated by the electric motor 158 (main induction motor). The motor 158 preferably has its circuit arranged to be controlled by the operator from different positions on the machine.

The motor shaft 159 is coupled to the worm drive shaft 156, as at 160, there being a friction block or drum 161 on the shafts to dampen the rotation thereof when the motor circuit is cut off.

Brake shoes 162 are pivoted to a base 163 and cooperate with the friction block 161. A tension rod 164, tension spring 165, and tension adjuster 166 are provided to cause the brake shoes 162 to grip the friction block 161. The brake shoe action is controlled by a magnetic control device which comprises a support 167 and an electro-magnet 168 whose armature lever 169 is connected by rods 171 to bell crank brake shoe spreader levers 170.

The circluit of the electro-magnet is so arranged that when motor 158 is energized, magnet 168 will also be energized and vice versa.

The sewing heads each include a needle bar 172 which is adjustably held in a bearing yoke 173 that is pivoted on a bearing stub 177 carried by a supporting plate 174 having slots 175 for the screw bolts 176.

Pinned to the needle bar 172 near its lower end is a stud carrying sleeve 178 to which a connecting rod 182 is pivoted. The connecting rod 182 is also connected to a crank pin 181 on a cam 180 which is fast to the cam shaft 179. The shaft 179 is mounted in a bearing 195 on the sewing head frame. The reference numeral 183 indicates the sewing needle, 184 indicates the thread guide adjacent thereto and 185 indicates the looper needle, the latter being carried by the looper bar 186 which is reciprocably and oscillatably mounted in suitable bearings 187.

The looper bar 186 carries a rocking arm 188 having a roller stud 189 to enter the groove of the cam 180. The looper is reciprocated by a connecting rod 190 having a cross groove 191 for the four-motion cam 192 on the cam shaft 179.

The looper bar 186 has a stud 193 to which the connecting rod 190 is pivoted. The stud is swivelly mounted on the bar 186 between two collars 194 pinned to the bar.

The cam shaft 179 also has an eccentric 196 for the connecting rod 203x to impart a reciprocating motion thereto.

Mounted in a suitable bearing 199 is a shaft 197 carrying a worm 198 and a ratchet wheel 200. It also has a stud 201 on which a rocking lever 202 is pivoted and to which the forked end 204 of the eccentric connecting rod 203x is pivoted. The lever 202 has a pawl 205 held against the ratchet wheel 200 by a spring 206. The cam shaft 179 is driven from the main worm drive shaft 156 by a worm gear 207.

Pivoted on the shaft 197 are the two crossed arms 209 and 210 of an adjustable swivel between the upper ends of lugs 211 of which is projected a key 208 held in the bearing 199 and acting as a centering stop. The adjustable swivel has bearings 213, 214 for the shafts 216 of the squeeze rolls 215. A squeeze control spring 212 is connected to the bearings 213 and 214.

The shafts 216 have worm gears 217 which mesh with the worm 198 and are held in place by collars 218 pinned to shafts 216.

The looper thread is indicated by 219 while the sewing thread is indicated by 220, and 221 indicates thread guides while 222 indicates adjustable thread tensions. The sewing thread 220 passes through a guide plate 223 on the front 224 of the sewing head.

The sewn cushions on leaving the sewing head pass between a pair of corrugated out-feed rollers 225 and 226 and over a smooth table 228 and a discharge roller 227.

The ribs of the pleats are indicated by 229 and the bats by 230.

The modified pleat feeding mechanism shown in Figures 35 and 36 comprises the rearward extensions 262 to the swivel brackets 209 and 210, having bearings 263 for the stub shafts 265, which are held in place by pinned collars 266 and which carry the grooved chain sprockets 264. Other stub shafts 268 are held in the bearings 213—214 and carry the worm gears 217, and the pinned collars 218. The stub shafts 268 carry grooved sprockets 267 and endless feed chains 269 pass around the pairs of sprockets 264—267 and extend along the sides of the pleat 229 to squeeze the pleat together and advance it positively with a step-by-step movement. It should be understood the flexibility of the materials operated on is such that, notwithstanding the conveyors that feed the cushions as a whole and the pleat forming mechanisms operate with a continuous movement, the rapid starting and positively stopping step-by-step motion of the chains 269 can stop and advance the ribs without the material piling up behind.

The periods of dwell of the ribs are of very short duration and the advance is sufficient to compensate the same so that the total linear speed of the pleats through the machine is the same as that of the conveyor 13, the pleat forming mechanism and the rollers 225—226.

It is also to be noted that the looper 185 lies close to the surface of the cloth 19 and to the rib 229 at the place where the sewing needle 183 penetrates the rib and thus constitutes a support for the rib and prevents the force of the needle from bending the rib over to one side of its vertical plane.

When cylindrical rolls of bats are used with my machine the rolls are mounted on tables 232 whose hubs 233 enter the cores of the bales, the tables 232 having lugs 234 to fit apertures in the upper race sections of a ball bearing 235 whose lower race sections are removably mounted on frames 236. The upper race sections are grooved at 237 to receive the brake shoes 238 whose section may be adjusted by screws 239.

If desired, bats packed in cartons 240 lap-fashion may be used with my machine, see Figures 33 and 34.

Attention is called to the fact that if the number of threads per inch be the same on shafts 98 and 152, the sprockets 154 and 100 will be of the same number of teeth. If, however, the number of threads per inch on shafts 98 and 152 are not the same, a corresponding change in sprocket ratio will have to be made in the machine. The ratios must be such that the sewing heads will move laterally in unison with the pleat forming gangs so as always to be in proper alignment therewith.

It should be understood further that the irons 101 all carry a full gang of supports 102 with sprockets 107 (Figures 8 and 9), but only those which are to form the pleats carry the disks 105, i. e., the two gangs nearest the center line of the machine have a full complement of five disks 105. The next two gangs each have four disks, the next two gangs each three disks, and the last gangs each two disks, counting the gangs from the central longitudinal line of the machine.

The conveyor 13 may be driven by a sprocket and chain connection 246 from shaft 131. The rollers 225—226 may be intergeared as at 248 and driven by sprocket and chain connection 247 from shaft 131x while shaft 131x may be driven from worm shaft 156 through the worm gear and shaft train 283, 284, 285, 286, 287. It should be understood the conveyors 13, 125 and rollers 225—226 move continuously in one direction with a relatively slow motion while the sewing machine rib pressing and feeding rollers 215 move in the pleats in the same direction by a relatively rapid stop and start or intermittent motion whereby while the needles are in the cloth the pleats will be at rest for that instant and friction on the needles is reduced to a minimum.

Instead of driving the conveyors as above described the mechanisms shown in Figures 42 to 45 may be and preferably are employed. Referring now to such figures it will be seen the motor 158 drives a worm shaft 299 through the medium of a silent chain 297 and gear 298, the worm shaft having a worm 300 which meshes with worm wheel 301 whose shaft 302 drives, through bevel gears 303—304, a shaft 305 that is suitably mounted on the frame 1. The shaft 305 in turn drives the shaft 307 of a Reeves variable speed transmission mechanism, via a sprocket and chain connection 306. The Reeves mechanism is of well known construction and a detailed disclosure and description thereof is thought to be unnecessary. It consists generally of a driving and a driven shaft 307—311 and carries cone pulleys 309 which are keyed to the respective shafts and are slidable along the same from and toward one another, there being a pair of pulleys on each shaft, the two pairs being connected by a belt 308. As the pulleys 309 on one shaft are moved farther apart those on the other shaft are correspondingly brought closer together thereby changing the driving ratio between the shafts 307 and 311. The shaft 311 drives shaft 131x through the sprocket and chain connection 312.

In Figure 46 is diagrammatically illustrated the circuit wiring for the machine.

Current from a three-phase system 349 passes through a knife switch 338 and fuse set 339. The neutral (central) fuse is connected to a fixed contact 341 of a motor circuit closer and to the magnet 340 thereof, the magnet being connected to an "on" and "off" switch 345, the latter being also connected to one side of the three-wire system (say 220 volts) to operate the magnet 340 on say 110 volts. The armature 342 of the motor circuit closer is connected to the middle wire of both motors 158 and 76. One side of the switch 345 is connected to magnet 168 and to one side of the motors 158—76 while the other side of magnet 168 and motors 158—76 are connected to the other armature 344 and the fixed contact 343 which cooperates with armature 344 is connected to the other side of the supply line via fuse 339 and switch 338. 346 is a simple snap switch to control action of magnet 88 whose circuit 245 is connected to one side of the line 349 via fuses 339 and switch 338 as shown.

The switches 346, 345, 338 are of well known construction and a detailed illustration and description thereof is thought to be unnecessary.

Operation

Briefly, the manner in which my machine operates is as follows:—

Assume that the cloth sheets 4 and 19 have been started into the pleat forming mechanism and the bats 230 have been started into positions between the cloths 4 and 19. The cloths 4 and 19 are passed over the first pair of pleat forming disks 105 and under the first pair of rolls 136 which cooperate with the disks (see Figure 2) to form two pleats, one at each side of the center line of the machine, thus giving form to the central bat receiving pocket. As the cloths 4 and 19 and bats 230 pass onward the second pair of pleats is formed by the outermost pair of disks 105 and their rolls 136 on the second shaft 135, while the two central pairs of disks 105 and rolls 136 carry forward the two pleats already formed. Continuing further the cloths and bats pass to the third set of pleat forming disks 105 and rolls 136 while the next two pleats are formed, one at each side, and so on until the required number of pleats have been formed (in the machine as illustrated, eight pleats).

It will be noticed that two pleats are formed at a time progressively one at each side of the center line of the machine, and only two pleats are formed by each transverse group of pleat formers, the outermost ones, while the intermediate pleat formers serve to retain the formed pleats and guide them to the sewing mechanism.

As the pleated cloths and the interposed bats reach the sewing mechanism, the pleats leave the last pleat disks 105 and are immediately gripped and squeezed by the combined feed and squeeze rolls 215 of the sewing machine, by which the pleats are advanced step-by-step through the sewing machines. Each time while the sewing needles enter and leave the cloth, the cloth movement is arrested so that when the needles are passing through the pleats 229 there will be no travelling movement of the pleats, thus taking the strain off the needles and preventing their becoming bent or broken.

As soon as the cloths 4 and 19 shall have advanced a predetermined distance, the bat cutting mechanism will be brought into action and the bat conveyors 34—35 will be stopped (by reason of the mutilated gear system). The cloths 4 and 9 will continue to advance, however, in order to space the cut ends of the bat apart and leave a transverse portion of the pleated cloths without a transverse portion of the pleated cloths without bats, so that the cloths may be cut across at stated intervals to produce individual cushions of such lengths as the machine may have been adjusted for.

The motors 76 and 158 have their circuit controlled by any suitably located switches 345 under control of the machine's attendant or operator, and one or more such controlling switches may be located at convenient points around the machine so that the operator may stop and start the machine at will wherever he may be.

The motors 158 and 76 are connected together so that they may both be stopped and started in unison.

If the user of the machine cares to cut the cloth 4 to a pattern, instead of feeding it in as a continuous length, the conveyor apron 13 is designed to project far enough beyond frame 1 (left hand end Figure 1) so that the operator can feed the cut cloths onto apron 13 one after another without interfering with the adjustment and working parts of the machine. This is a feature not found in other machines for the purpose.

The squeeze rolls 215 (Figures 17, 18, 19) or the squeeze chains 269 (Figures 35 and 36) are the only driven parts of the machine that operate with an intermittent or step-by-step motion, and because of the perfected speed mechanism for driving the same, wrinkling or jamming of the continuously travelling cushion and its formed pleat is avoided and yet a perfect double locked stitch is produced. With the multiple lock stitching machines used prior to my invention the production is limited to a certain speed and if the machines are operated above such speed the sewing needles get hot and scorch the cloth and before the sewing needles reach the scorching heat they frequently bend and break off, thereby requiring stopping of the machine in order to replace needles, thus slowing up production. To overcome the expensive condition as stated above I have perfected a new method of making a multiple double locked stitch and by the working mechanism of my new method I eliminate the breaking of the sewing needles and the scorching of the cloth by the hot sewing needles and also eliminate loss of production.

From the foregoing description, taken in connection with the accompanying drawings the construction, operation, and many advantages of my invention will, it is thought, be clearly apparent to those skilled in the art.

While I have shown and described the preferred embodiments of my invention, it is to be understood that changes in the details of construction, combination and arrangement of parts can be made without departing from the spirit of the invention as defined in the appended claims.

What I claim is:

1. In upholstery making machines, a bat in-feeding mechanism, a bat severing mechanism, a lower cloth conveyor over which the bottom cloth is carried beneath the in-feed mechanism and the bat cutting mechanism, an upper cloth delivering means located to pass the top cloth over the severed bat lengths on the bottom cloth, a continuously moving pleat forming mechanism to which the top and bottom cloths and interposed bats pass as a continuous cushion, sewing mechanism to receive the pleated cushion from the pleat forming mechanism, means to arrest the movement of the bat in-feeding mechanism and operate the severing mechanism, said sewing mechanism including sewing needles, and means to arrest the travel of the material through the sewing mechanism while the sewing needles enter and leave the pleated seams.

2. In upholstery making machines, a bat in-feeding mechanism, a bat severing mechanism, a lower cloth conveyor over which the bottom cloth is carried beneath the in-feed mechanism and the bat cutting mechanism, an upper cloth delivering means located to pass the top cloth over the severed bat lengths on the bottom cloth, a continuously moving pleat forming mechanism to which the top and bottom cloths and interposed bats pass as a continuous cushion, sewing mechanism to receive the pleated cushion from the pleat forming mechanism, said sewing mechanism including sewing needles, and means to arrest the travel of the material through the sewing mechanism while the sewing needles enter and leave the pleat seams.

3. In upholstery making machines wherein are provided a plurality of pleat forming instrumentalities and a corresponding plurality of sewing machines to sew the seams of the pleats formed by the pleat forming instrumentalities, the combination with the aforesaid structure of means simultaneously to adjust the positions of said pleat forming instrumentalities and said sewing machines to effect different widths of pleat pockets at will.

4. In upholstery making machines wherein are provided a plurality of pleat forming instrumentalities and a corresponding plurality of sewing machines to sew the seams of the pleats formed by the pleat forming instrumentalities, the combination with the aforesaid structure of means simultaneously to adjust the positions of said pleat forming instrumentalities and said sewing machines to effect different widths of pleat pockets at will and while the machine is in operation.

5. In upholstery making machines, in combination with a pleat forming mechanism which includes parallel gangs of pleat formers, a parallel set of sewing machines, one for each pleat seam, and means for causing the simultaneous adjustment laterally of the several gangs of pleat formers to vary the width of the pleat pockets being made, and means for causing adjustment laterally of said sewing machines whereby they may be positioned to sew the pleats of the varied width pockets.

6. In upholstery making machines, in combination with a pleat forming mechanism which includes parallel gangs of pleat formers, a parallel set of sewing machines, one for each pleat seam, and means for simultaneously adjusting laterally said pleat formers and sewing machines to vary the width of pleat pockets being made.

7. In upholstery making machines, in combination with a pleat forming mechanism which includes parallel gangs of pleat formers, a parallel set of sewing machines, one for each pleat seam, means for adjusting laterally said pleat formers and sewing machines to vary the width of pleat pockets being made, said adjusting means including a lazy tongs adjuster for the gangs of pleat formers, and a lazy tongs adjuster for the sewing machines, and means for operating said lazy tongs in unison.

8. In upholstery making machines, a lower cloth conveyor, a continuous-bat in-feeding mechanism, means to cut the bats into lengths and deliver the same onto the lower cloth as it passes along, means for delivering an upper cloth over the bats on the lower cloth, continuously moving means for taking the said cloths and forming the same into rib pleats with bat pockets between the ribs thereof, and a sewing mechanism to receive the pleat ribs, which sewing mechanism includes sewing needles and means to feed the pleats step by step past the sewing needles to sew the cloths of the ribs together.

9. In upholstery making machines, a continuously moving lower cloth conveyor, a continuous-bat in-feeding mechanism, means to cut the bats into lengths and deliver the same onto the lower cloth as it passes along, means to temporarily arrest the bat in-feeding mechanism without arresting the cloth conveyor to provide spaces between the cut ends of the bats, means for delivering an upper cloth over the bats on the lower cloth, means for taking the said cloths and forming the same into rib pleats with bat pockets between the ribs thereof, and a sewing mechanism to receive the pleat ribs intermittently feed same through the sewing mechanism and sew the cloths of the ribs together.

10. In upholstery making machines, a lower cloth conveyor, a continuous-bat in-feeding mechanism, means to sever the bats into lengths and deliver the same onto the lower cloth as it passes along, means for delivering an upper cloth over the bats on the lower cloth, continuously acting means for taking the said cloths and forming the same into rib pleats with bat pockets between the ribs thereof, a sewing mecahnism to receive the pleat ribs, feed same through the machine and sew the cloths of the ribs together, and means to arrest the cloth ribs at the sewing mechanism while the sewing needles are passing through the pleat ribs.

11. In upholstery making machines, a lower cloth conveyor, a continuous-bat in-feeding mechanism, means to sever the bats into lengths and deliver the same onto the lower cloth as it passes along, means to temporarily arrest the bat in-feeding mechanism without arresting the cloth conveyor to provide spaces between the severed ends of the bats, means for delivering an upper cloth over the bats on the lower cloth, continuously acting means for taking the said cloths and forming the same into rib pleats with bat pockets between the ribs thereof, a sewing mechanism to receive the pleat ribs, feed same through the machine and sew the cloths of the ribs together, and means to arrest the cloth ribs at the sewing mechanism while the sewing needles are passing through the pleat ribs.

12. In upholstery making machines wherein superposed strips of cloth are pleated to form pockets and pleat ribs, mechanism for taking strips of cloth and forming pleat pockets and ribs therein, said mechanism including means for forming a central pocket and two pleat ribs, then successively forming two more pockets and ribs, one at each side of the first pair of ribs, and so on until the desired number of ribs and pockets are formed, said means including gangs of pleat forming and guiding disks and roll sets cooperating with the disks, and means for moving the gangs laterally to give wider or narrower pockets between ribs as desired.

13. In upholstery making machines wherein superposed strips of cloth are pleated to form pockets and pleat ribs, mechanism for taking strips of cloth and forming pleat pockets and ribs therein, said mechanism including means for forming a central pocket and two pleat ribs, then successively forming two more pockets and ribs, one at each side of the first pair of ribs, and so on until the desired number of ribs and pockets are formed, said means including gangs of pleat forming and guiding disks and roll sets cooperating with the disks, means for moving the gangs laterally to give wider or narrower pockets between ribs as desired, in combination with a sewing mechanism comprising a sewing head for each rib, means mounting said sewing heads for lateral adjustment, and means to move said sewing heads laterally accordingly as the spaces between the rib forming gangs are increased or decreased.

14. In upholstery making machines, the combination with the pleat forming mechanism which includes means to form a plurality of alternating parallel pleat ribs and pockets, and mechanism to sew the ribs; of mechanism for simultaneously adjusting the pleat forming mechanism and the pleat sewing mechanism laterally to give wider or narrower pleat pockets.

15. In upholstery making machines, the combination with the pleat forming mechanism which includes means to form a plurality of alternating parallel pleat ribs and pockets, and mechanism to sew the ribs; of mechanism for simultaneously adjusting the pleat forming mechanism and the pleat sewing mechanism laterally to give wider or narrower pleat pockets, said adjusting means including separate adjusters for the pleat forming mechanism and for the sewing mechanism, and a single means to operate both adjusters in unison.

16. In upholstery making machines, pleat forming and sewing mechanisms, means for holding rolls of cloth spaced apart, means for guiding the cloths so as to cause them to converge toward and be fed into the pleat forming mechanism in superposed relation, bat cutting mechanism located at a position between the upper and lower cloths and in advance of the place where they enter the pleat forming mechanism, bat feeding mechanism to deliver bats through the cutting mechanism into the pleat pockets where the upper and lower cloths meet and enter the pleat forming mechanism, means to arrest the action of the bat feeding and delivering mechanism upon actuation of said cutting mechanism while the severed bat sections are advanced with the cloths a predetermined distance, said bat feeding mechanism comprising upper and lower endless conveyors between which the bats lie, and means to drive said conveyors in timed relation with said pleat forming mechanism, said driving means including a gear train having a mutilated gear for the purpose described.

17. In upholstery making machines, pleat forming and sewing mechanisms, means for holding rolls of cloth spaced apart, means for guiding the cloths so as to cause them to converge toward and be fed into the pleat forming mechanism in superposed relation, bat cutting mechanism located at a position between the upper and lower cloths and in advance of the place where they enter the pleat forming mechanism, bat feeding mechanism to deliver bats through the cutting mechanism into the pleat pockets where the upper and lower cloths meet and enter the pleat forming mechanism, and means to arrest the action of the bat feeding and delivering mechanism upon actuation of said cutting mechanism while the severed bat sections are advanced with the cloths a predetermined distance, said cutting mechanism including a stationary blade and a rotating blade cooperating with the stationary blade and means for effecting rotation of said rotating blade at timed intervals.

18. In upholstery making machines, pleat forming and sewing mechanisms, means for holding rolls of cloth spaced apart, means for guiding the cloths so as to cause them to converge toward and be fed into the pleat forming mechanism in superposed relation, bat cutting mechanism located at a position between the upper and lower cloths and in advance of the place where they enter the pleat forming mechanism, bat feeding mechanism to deliver bats through the cutting mechanism into the pleat pockets where the upper and lower cloths meet and enter the pleat forming mechanism, means to arrest the action of the bat feeding and delivering mechanism upon actuation of said cutting mechanisms while the severed bat sections are advanced with the cloths a predetermined distance, said bat feeding mechanism comprising upper and lower endless conveyors between which the bats lie, and means to drive said conveyors in timed relation with said pleat forming mechanism, said driving means including a gear train having a mutilated gear, said cutting mechanism including a stationary blade and a rotating blade cooperating with the stationary blade, and means for effecting rotation of said rotating blade at timed intervals.

19. In upholstery making machines, pleat forming and sewing mechanisms, means for holding rolls of cloth spaced apart, means for guiding the cloths so as to cause them to converge toward and be fed into the pleat forming mechanism in superposed relation, bat cutting mechanism located at a position between the upper and lower cloths and in advance of the place where they enter the pleat forming mechanism, bat feeding mechanism to deliver bats through the cutting mechanism into the pleat pockets where the upper and lower cloths meet and enter the pleat forming mechanism, and means to arrest the action of the bat feeding and delivering mechanism upon actuation of said cutting mechanism while the severed bat sections are advanced with the cloths a predetermined distance, said cutting mechanism including a stationary blade and a rotating blade cooperating with the stationary blade and means for effecting rotation of said rotating blade at timed intervals, said last named means comprising an electric motor, an electrically controlled one-revolution-and-stop clutch device, and means actuated by a suitable moving part of the machine for effecting the electrical control to actuate said motor at timed intervals.

20. In upholstery making machines, pleat forming and sewing mechanisms, means for holding rolls of cloth spaced apart, means for guiding the cloths so as to cause them to converge toward and be fed into the pleat forming mechanism in superposed relation, bat cutting mechanism located at a position between the upper and lower cloths and in advance of the place where they enter the pleat forming mechanism, bat feeding mechanism to deliver bats through the cutting mechanism into the pleat pockets where the upper and lower cloths meet and enter the pleat forming mechanism, means to arrest the action of the bat feeding and delivering mechanism upon actuation of said cutting mechanisms while the severed bat sections are advanced with the cloths a predetermined distance, said bat feeding mechanism comprising upper and lower endless conveyors between which the bats lie, and means to drive said conveyors in timed relation with said pleat forming mechanism, said driving means including a gear train having a mutilated gear, said cutting mechanism including a stationary blade and a rotating blade cooperating with the stationary blade, means for effecting rotation of said rotating blade at timed intervals, said last named means comprising an electric motor, an electrically controlled one-revolution-and-stop clutch device, and means actuated by a suitable moving part of the machine for effecting the electrical control to actuate said motor at timed intervals.

21. In upholstery making machines, a single pleat rib forming unit, comprising a support, a stub shaft mounted in bearings on said support, a wafer disk on said shaft, and a grooved roller cooperating with said disk.

22. In upholstery making machines, pleat forming mechanism including a pair of pleat rib forming units spaced apart laterally, in combination with a sewing mechanism including a pair of sewing heads spaced apart laterally and located in longitudinal alignment with the pleat forming units respectively, and means for moving said units and heads laterally closer together or farther apart, in unison, for the purposes described.

23. In upholstery making machines, a pleat forming mechanism comprising a plurality of parallelly disposed longitudinally extending supports having slide bearings, a pair of transversely disposed slideways for said slide bearings, pleat forming disk units on said longitudinally extending supports, transversely disposed shafts located above said units, grooved rolls on said shafts, one for each pleat forming disk, and means for simultaneously increasing or diminishing the lateral spacing of said supports, disks and rolls to increase or diminish uniformly the width of the pleat pockets.

24. In upholstery making machines, a pleat forming mechanism comprising a plurality of parallelly disposed longitudinally extending supports having slide bearings, a pair of transversely disposed slideways for said slide bearings, pleat forming disk units on said longitudinally extending supports, transversely disposed shafts located above said units, grooved rolls on said shafts, one for each pleat forming disk, and means for simultaneously increasing or diminishing the lateral spacing of said supports, disks and rolls to increase or diminish uniformly the width of the pleat pockets, said means comprising a lazy tongs device between said supports and means to operate said device.

25. In upholstery making machines, a pleat forming mechanism including a laterally extensible and contractible conveyor for the material, gangs of pleat forming mechanisms cooperative therewith, means for simultaneously moving said gangs laterally and expanding or contracting said conveyor accordingly as said gangs are moved from or toward a center line of the machine.

26. In an upholstery making machine, a pleat forming mechanism comprising a pair of transversely extending shafts spaced apart, a set of slide bearings on each shaft, longitudinally extending parallelly disposed beams each connecting a bearing on one shaft with a bearing on the other shaft in longitudinal alignment therewith, pleat forming units on said beams, a second pair of transversely extending shafts spaced apart, a central block fixed to said second pair of shafts, a pair of end slide blocks slidable to and from said central block along said second pair of shafts, a lazy tongs linkage system connecting said block with said slide bearings, an operating shaft having oppositely threaded portions for engaging with the end slide blocks respectively, and means for turning said operating shaft for purposes described.

27. In an upholstery making machine, a pleat forming mechanism comprising a pair of transversely extending shafts spaced apart, a set of slide bearings on each shaft, longitudinally extending parallelly disposed beams each connecting a bearing on one shaft with a bearing on the other shaft in longitudinal alignment therewith, pleat forming units on said beams, a second pair of transversely extending shafts spaced apart, a central block fixed to said second pair of shafts, a pair of end slide blocks slidable to and from said central block along said second pair of shafts, a lazy tongs linkage system connecting said block with said slide bearings, an operating shaft having oppositely threaded portions for engaging with the end slide blocks respectively, and means for turning said operating shaft, said pleat forming units including a set of sprockets and endless chains for each set of units on a beam, and telescopic elements carried by said chains to form a laterally extensible and contractible supporting apron for the material operated on, said sets of sprockets and chains being laterally movable with their respective beams.

28. In upholstery making machines, a pleat forming unit comprising a support having bearings, a stub shaft journalled in the same, two sprockets and a pleat forming disk therebetween carried by said shaft, spacer disks between the pleat forming disks and the sprockets, means securing said sprockets and said disks together as one, a grooved roll to receive the edge of said disk, and means to support said roll.

29. In upholstery making machines, a pleat forming mechanism including pleat forming disks and rollers and an endless carrier for the work, said disk and rollers being arranged in longitudinally disposed laterally spaced gangs and said carrier including corresponding sets of endless chains and sprockets therefor, said chains having transversely directed alternately disposed rods and tubes, the rods of one set of chains projecting into the tubes of an adjacent set of chains, all being arranged whereby said gangs may be laterally adjusted closer or farther apart and said endless carrier thereby contracted or extended laterally, and means for adjusting said gangs laterally for the purpose specified.

30. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a sewing bar and a looper bar, a cam shaft driven continuously from said worm shaft, means to actuate said sewing bar and said looper bar from said cam shaft, a pair of pleat rib feeding and squeezing rolls, and means to operate said rolls with a step-by-step motion in time with the action of the sewing and looper bars whereby when the sewing needle is penetrating the pleat rib the work will be at rest.

31. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a sewing bar and a looper bar, a cam shaft driven continuously from said worm shaft, a cam on said cam shaft which has a groove, an arm on said looper bar with a member riding in said groove for oscillating said bar on its axis, said cam having a crank pin, said sewing bar being oscillatably mounted and having a connecting rod to said crank pin, a four-motion cam on said cam shaft and a connecting rod between said four-motion cam and said looper bar for reciprocating it along its axis.

32. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a sewing bar and a looper bar, a cam shaft driven continuously from said worm shaft, a cam on said cam shaft which has a groove, an arm on said looper bar with a member riding in said groove for oscillating said bar on its axis, said cam having a crank pin, said sewing bar being oscillatably mounted and having a connecting rod to said crank pin, a four-motion cam on said cam shaft and a connecting rod between said four-motion cam and said looper bar for reciprocating it along its axis, a pair of pleat rib feeding and squeezing rolls, shafts therefor, worm gears on said shafts, a worm shaft having a worm meshing with said worm gears, a pawl and ratchet mechanism for imparting a step-by-step motion to said last named worm shaft and consequently to said rolls.

33. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a sewing bar and a looper bar, a cam shaft driven continuously from said worm shaft, a cam on said cam shaft which has a groove, an arm on said looper bar with a member riding in said groove for oscillating said bar on its axis, said cam having a crank pin, said sewing bar being oscillatably mounted and having a connecting rod to said crank pin, a four-motion cam on said cam shaft and a connecting rod between said four-motion cam and said looper bar for reciprocating it along its axis, a pair of pleat rib feeding and squeezing rolls, shafts therefor, worm gears on said shafts, a worm shaft having a worm meshing with said worm gears, a pawl and ratchet mechanism for imparting a step-by-step motion to said worm shaft and consequently to said rolls, said pawl and ratchet mechanism including an operating cam on said cam shaft and a rocking lever operated thereby, a ratchet on the last named worm shaft and a pawl on said rocking lever to actuate said ratchet.

34. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a bearing to receive said mounted bar, means to hold the head immovably on the bar when desired, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, and means to feed the work past between the sewing and looper bars.

35. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a bearing to receive said mounted bar, means to hold the head immovably on the bar when desired, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, means to feed the work past between the sewing and looper bars, said feeding means comprising a pair of feed rolls, and means for driving said rolls from said cam shaft.

36. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a bearing to receive said mounted bar, means to hold the head immovably on the bar when desired, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, means to feed the work past between the sewing and looper bars, said feeding means comprising a pair of feed and squeeze rolls with shafts, said roll shafts having worm gears, a worm shaft meshing therewith, and means to impart rotation to said last named worm shaft from said cam shaft.

37. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including a bearing to receive said mounted bar, means to hold the head immovably on the bar when desired, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, means to feed the work past between the sewing and looper bars, said feeding means comprising a pair of feed and squeeze rolls having shafts, said roll shafts having worm gears, a worm shaft meshing therewith, means to impart rotation to said last named worm shaft from said cam shaft, supports for said feed roll shafts which supports are pivoted on said last named worm shaft. and a spring connection between said supports for pulling the feed rolls toward one another to squeeze the pleat rib.

38. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames, means for driving said worm shaft continuously, each sewing head including pleat rib feeding and squeezing rolls and sewing and looper bars and needles, and means connecting adjacent sewing heads together for lateral adjustment along said mounting bar, said means including a lazy tongs linkage system, and means to operate the same.

39. In upholstery making machines, a pleat rib sewing mechanism comprising a transversely disposed fixedly mounted bar, bracket frames supporting said bar, a set of sewing heads mounted on said bar for movement along the same toward and from each other, a single worm drive shaft for all sewing heads, which shaft is journalled in said bracket frames. means for driving said worm shaft continuously, each sewing head including pleat rib feeding and squeezing rolls and sewing and looper bars and needles, parallel shafts carried by said mounting brackets. a block fixed to said parallel shaft centrally of the machine, end slide blocks on said parallel shafts, means to move said end slide blocks toward and from said fixed block, and a lazy tongs linkage system between said block and said sewing heads for the purposes described.

40. In upholstery making machines, an adjustable ribbed-pleat forming mechanism, means to convey upper and lower cloths in superposed relation to and through the pleat forming mechanism with a continuous motion forwardly, means to feed parallel rows of bats to and between said upper and lower cloths, means for causing the adjustment of the pleat forming mechanism for forming wider or narrower pleat pockets, and means for causing the adjustment of the spacing apart of the bats to correspond to the adjustments of the pleat forming mechanism.

41. In upholstery making machines, an adjustable ribbed-pleat forming mechanism, means to convey upper and lower cloths in superposed relation to and through the pleat forming mechanism with a continuous motion forwardly, means to feed parallel rows of bats to and between said upper and lower cloths, means for causing the adjustment of the pleat forming mechanism for forming wider or narrower pleat pockets, and means for causing the adjustment of the spacing apart of the bats to correspond to the adjustments of the pleat forming mechanism, and a bat sewing mechanism operating on the pleat ribs on leaving the pleat forming mechanism, and means for adjusting the sewing mechanism in harmony with the adjustments of the pleat forming mechanism.

42. In upholstery making machines, a ribbed-pleat forming mechanism, means to convey upper and lower cloths in superposed relation to and through the pleat forming mechanism with a continuous motion forwardly, means to feed parallel rows of bats to and between said upper and lower cloths, means for adjusting the pleat forming mechanism for wider or narrower pleat pockets, means for adjusting the spacing apart of the bats to correspond to the adjustments of the pleat forming mechanism, said bat adjusting mechanism including spacing fingers between the rows of bats, and a lazy tongs lever system operating said fingers for purposes specified.

43. In upholstery making machines, means for conveying an upper and a lower cushion cloth to pleating and sewing mechanisms, combined with a mechanism for feeding continuous-bats to and between said cloth to be contained in the pockets of the cushion, said pleating and sewing mechanism including laterally adjustable units in virtue of which wider or narrower pleat pockets may be formed and bat spacing and adjusting mechanism including means for simultaneously laterally spacing the bats to line up with the respective pleat pockets being formed.

44. In upholstery making machines, means for conveying an upper and a lower cushion cloth to pleating and sewing mechanism, combined with a mechanism for feeding continuous-bats to and between said cloth to be contained in the pockets of the cushion, and bat spacing adjusting mechanism for lining up the bats with their respective pockets, said adjusting mechanism comprising fingers between the bats, and means simultaneously to move the fingers apart or together accordingly as wider or narrower bats are to be used.

45. In upholstery making machines, means for conveying an upper and a lower cushion cloth to pleating and sewing mechanisms, combined with a mechanism for feeding continuous-bats to and between said cloth to be contained in the pockets of the cushion, and bat severing mechanism comprising rotary shears, a motor to operate said shears, one-revolution-and-stop clutch connecting said motor and shears, a magnetic clutch control, an electric operating circuit for said magnetic clutch control and circuit closing instrumentalities for intermittently closing and opening the magnet's circuit.

46. In upholstery making machines, means for conveying an upper and a lower cushion cloth to pleating and sewing mechanisms, combined with a mechanism for feeding continuous-bats to and between said cloth to be contained in the pockets of the cushion, and bat severing mechanism comprising rotary shears, a motor to operate said shears, one-revolution-and-stop clutch connecting said motor and shears, a magnetic clutch control, an electric operating circuit for said magnetic clutch control and circuit closing instrumentalities for intermittently closing and opening the magnet's circuit, the same comprising two open circuit switches, and a reciprocating circuit closer cooperative with said switches and means operable by a continuously moving part of the machine for actuating said circuit closer, and means to vary the speed of movement of said circuit closer at will.

47. A sewing machine comprising an arcuate looper needle oscillatable about a vertical axis, an arcuate sewing needle oscillatable about a horizontal axis and movable in approximately a line parallel to the plane in which the looper needle oscillates, the planes in which said needles oscillate intersecting one another, and pleat rib feeding means to convey rib-pleated articles past said needles and beneath and close to the plane in which the looper needle oscillates in virtue of all of which the looper needle will hold down the work and brace the pleat for the sewing needle.

48. The method of making pleated upholstery cushions which consists in providing a gang of sewing machines, passing the top and bottom cushion cloths and interposed bats in superposed relation toward the sewing machines, and as the materials approach the sewing machines, forming pleats in the cloths in parallel rows, by first forming two pleats at the center, then two more one at each side of the center two, and so on progressively until the required number of pleats have been formed, passing the cushion through the sewing machines with a continuous movement of the body of the cushion and an intermittent motion of the pleats, in virtue of which the sewing needles will pass through the pleats while they are at rest, substantially as described.

49. The method of manufacturing pleated upholstery cushions which consists in moving an upper and a lower cloth continuously in the same direction in superposed relation, inserting bats between said cloths spaced laterally apart, forming the cloth between adjacent bats with ribbed pleats, sewing the cloths of the pleats together as the same pass a given place, and momentarily stopping the movement of the pleat ribs alone while the sewing needles are penetrating the ribs.

50. In upholstery making machines, means for conveying an upper and a lower cushion cloth to pleating and sewing mechanisms, combined with a mechanism for feeding bats to and between said cloth to be contained in the pockets of the cushion, and bat severing mechanism comprising rotary shears, a motor to operate said shears, a one-revolution-and-stop clutch connecting said motor and shears, a magnetic clutch control, an electric operating circuit for said magnetic clutch control and circuit closing instrumentalities for intermittently closing and opening the magnet's circuit, the same comprising two open circuit switches, and a reciprocating circuit closer cooperative with said switches and means operable by a continuously moving part of the machine for actuating said circuit closer.

51. A sewing machine for sewing upstanding ribs in rib-pleated articles comprising a looper needle oscillatable about a vertical axis, a sewing needle oscillatable about a horizontal axis, the planes in which said needles oscillate intersecting one another, and pleat rib feeding means to convey rib-pleated articles past said needles, the looper needle being arranged in proximity to the work to hold down the article and brace the pleat for the sewing needle.

52. In upholstery making machines, a pleat rib sewing mechanism comprising a set of sewing heads, each sewing head carrying a sewing needle oscillatable about a horizontal axis and a looper needle oscillatable about a vertical axis, means for actuating said needles, continuously acting means for feeding the pleated upholstery to the sewing mechanism, pleat squeezing and feed control mechanism cooperative with the sewing mechanism in advance of the needles for intermittently retarding the forward feed of the pleat to allow the sewing needles to puncture the pleat while the movement is arrested.

53. In upholstery making machines, a pleat rib sewing mechanism comprising a set of sewing heads, each sewing head carrying a sewing needle and a looper needle, means for actuating said needles, continuously acting means for feeding the pleated upholstery to the sewing mechanism, pleat squeezing and feed control mechanism cooperative with the sewing mechanism in advance of the needles for intermittently retarding the forward feed of the pleat to allow the sewing needles to puncture the pleat while the movement is arrested, said pleat squeezing and feed control mechanism comprising a pair of endless chains between which the pleat passes, and a pawl and ratchet mechanism for advancing the chains intermittently in harmony with the movements of the sewing needles.

54. In an upholstery making machine, a pleat rib sewing mechanism comprising a support, a sewing head mounted on said support, a worm drive shaft for said sewing head, means for driving said worm shaft continuously, said sewing head including a sewing bar and a looper bar, a cam shaft driven continuously from said worm shaft, a cam on said cam shaft which has a groove, an arm on said looper bar with a member riding in said groove for oscillating said bar on its axis, said cam having a crank pin, said sewing bar being oscillatably mounted and having a connecting rod to said crank pin, a four-motion cam on said cam shaft and a connecting rod between said four-motion cam and said looper bar for reciprocating it along its axis.

55. In an upholstery making machine, a pleat rib sewing mechanism comprising a support, a sewing head mounted on said support, a worm drive shaft for said sewing head, means for driving said worm shaft continuously, said sewing head including a sewing bar and a looper bar, a cam shaft driven continuously from said worm shaft, a cam on said cam shaft which has a groove, an arm on said looper bar with a member riding in said groove for oscillating said bar on its axis, said cam having a crank pin, said sewing bar being oscillatably mounted and having a connecting rod to said crank pin, a four-motion cam on said cam shaft and a connecting rod between said four-motion cam and said looper bar for reciprocating it along its axis, a pair of pleat rib feeding and squeezing rolls, shafts therefor, worm gears on said shafts, a worm shaft having a worm meshing with said worm gears, and a pawl and ratchet mechanism for imparting a step-by-step motion to said last named worm shaft and consequently to said rolls.

56. In an upholstery making machine, a pleat rib sewing mechanism comprising a support, a sewing head mounted on said support, a worm drive shaft for said sewing head, means for driving said worm shaft continuously, said sewing head including a sewing bar and a looper bar, a cam shaft driven continuously from said worm shaft, a cam on said cam shaft which has a groove, an arm on said looper bar with a member riding in said groove for oscillating said bar on its axis, said cam having a crank pin, said sewing bar being oscillatably mounted and having a connecting rod to said crank pin, a four-motion cam on said cam shaft and a connecting rod between said four-motion cam and said looper bar for reciprocating it along its axis, a pair of pleat rib feeding and squeezing rolls, shafts therefor, worm gears on said shafts, a worm shaft having a worm meshing with said worm gears, a pawl and ratchet mechanism for imparting a step-by-step motion to said last named worm shaft and consequently to said rolls, said pawl and ratchet mechanism including an operating cam on said cam shaft and a rocking lever operated thereby, a ratchet on said last named worm shaft and a pawl on said rocking lever to operate said ratchet.

57. In an upholstery making machine, a support, a sewing head mounted on said support, a vertically reciprocable looper bar having a vertical axis, means to mount said bar to rock on its vertical axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, and means to feed the work past the sewing and looper bars.

58. In an upholstery making machine, a support, a sewing head mounted on said support, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, means to feed the work past the sewing and looper bars, said feeding means comprising a pair of feed rolls, and means for driving said rolls from said cam shaft.

59. In an upholstery machine, a support, a sewing head mounted on said support, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, means to feed the work past the sewing and looper bars, said feeding means comprising a pair of feed and squeeze rolls with shafts, said feed and squeeze rolls' shafts having worm gears, a worm shaft meshing therewith, and means to impart rotation to said worm shaft from said cam shaft.

60. In an upholstery machine, a support, a sewing head mounted on said support, a vertically reciprocable looper bar mounted to rock on its axis, a pivotally mounted sewing bar mounted to oscillate on its pivot, a continuously rotating cam shaft, means on said cam shaft and connected with said bars for reciprocating and rocking said looper bar and oscillating said sewing bar in cooperation, a sewing needle carried by the sewing bar and a looper needle carried by the looper bar, means to feed the work past the sewing and looper bars, said feeding means comprising a pair of feed and squeeze rolls with shafts, said feed and squeeze rolls' shafts having worm gears, a worm shaft meshing therewith, means to impart rotation to said worm shaft from said cam shaft, supports for the feed rolls' shafts which supports are pivoted on said worm shaft, and a spring connection between said supports for pulling the feed rolls toward one another to squeeze the pleat rib.

ALPHONSE G. FORGET.